(12) United States Patent
Fujii et al.

(10) Patent No.: US 7,151,808 B2
(45) Date of Patent: Dec. 19, 2006

(54) MIMO RECEIVER AND METHOD OF RECEPTION THEREFOR

(75) Inventors: Hiromasa Fujii, Yokosuka (JP); Tetsushi Abe, Yokohama (JP); Shigeru Tomisato, Yokohama (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 779 days.

(21) Appl. No.: 10/386,571

(22) Filed: Mar. 13, 2003

(65) Prior Publication Data

US 2003/0174767 A1    Sep. 18, 2003

(30) Foreign Application Priority Data

Mar. 13, 2002  (JP) ............................. 2002-069008

(51) Int. Cl.
*H04L 1/02* (2006.01)
*H03D 3/22* (2006.01)

(52) U.S. Cl. ....................... 375/347; 375/232

(58) Field of Classification Search ............... 375/316, 375/147, 148, 229, 330, 232, 231, 346, 347, 375/349, 371, 362, 363, 364, 365, 366, 367, 375/354, 267, 285; 370/503, 516, 509–514; 455/132, 133, 137; 708/322, 323
See application file for complete search history.

(56) References Cited

U.S. PATENT DOCUMENTS

| | | | | |
|---|---|---|---|---|
| 5,537,443 A | * | 7/1996 | Yoshino et al. | ............. 375/340 |
| 6,243,415 B1 | | 6/2001 | Pipon et al. | |
| 6,310,896 B1 | | 10/2001 | Langberg et al. | |
| 6,314,147 B1 | * | 11/2001 | Liang et al. | ............. 375/346 |
| 6,470,044 B1 | * | 10/2002 | Kowalski | ............. 375/148 |
| 7,039,094 B1 | * | 5/2006 | Kim et al. | ............. 375/147 |
| 2002/0021749 A1 | * | 2/2002 | Lee et al. | ............. 375/150 |

FOREIGN PATENT DOCUMENTS

EP    1 204 235    5/2002

OTHER PUBLICATIONS

Tetsushi Abe, et al., "Space-Time Turbo Equalization and Symbol Detection in Frequency Selective MIMO Channels", IEEE Vehicular Technology Conference, XP-001124945, Oct. 7-11, 2001, pp. 1230-1234.

Arto Palin, et al., "Symbol Synchronization in OFDM System for Time Selective Channel Conditions", IEEE International Conference on Circuits and Systems, XP-010361802, Sep. 5-8, 1999, pp. 1581-1584.

Yoshitaka Hara, et al., "Initial Synchronization Techniques for Antenna Arrays in the Presence of Interference Signals", IEEE Vehicular Technology Conference, XP-010608772, Sep. 24-28, 2002, pp. 1953-1957.

* cited by examiner

*Primary Examiner*—Tesfaldet Bocure
*Assistant Examiner*—Vineeta Panwalkar
(74) *Attorney, Agent, or Firm*—Oblon, Spivak, McClelland, Maier & Neustadt, P.C.

(57) ABSTRACT

The accuracy of an equalization start timing, an equalization duration and a channel estimation is improved in an application including an increased number of users. An equalization start timing $t0$, an equalization duration $te$ and channel $H$ estimation are performed for each user signal, and using these, received signal replicas $Re_1$ ro $Re_N$ for the respective users are generated. The replicas are subtracted from the received signal to provide an error signal, and $Re_1$ to $Re_N$ are added to Es to provide an interference suppressed received signals for the users 1 to N. to, te, H and $Re_1$ to $Re_N$ are generated from these to generate Es in a repeated fashion to improve the accuracy of $t0$, $te$ and H.

10 Claims, 31 Drawing Sheets

MIMO RECEIVER AND METHOD OF RECEPTION THEREFOR

BACKGROUND OF THE INVENTION

The present invention relates to a multi-input multi-output (MIMO) receiver and a method of reception as may be used in a concurrent transmission on a common frequency band and which apply an adaptive equalization processing to received signals received from N transmitters (where N is an integer equal to and greater than 2) by way of M antennas (where M is an integer equal to or greater than 2) for purpose of decoding processing.

A task in the mobile station communication business is how to construct a system capable of accommodating for a multitude of users on a limited frequency band with a high quality. A multi-input multi-output (MIMO) system is known in the art as means for solving such a task. In this system, a first to an N-th transmitter use a common frequency band to transmit a first to an N-th symbol sequence signal, respectively, during a common time interval. These transmitted signals are received by an MIMO receiver equipped with a plurality of antennas #1 to #M. The received signals are processed by the MIMO receiver, which estimates the first to the N-th transmitted signal from the first to the N-th transmitter and delivers them to output terminals Out-1 to Out-N separately for each transmitter.

An arrangement of a single transmitter in the MIMO system is shown in FIG. 1. An error correction coding is applied to information bits in a channel coder 51, and a resulting coded bit sequence is interleaved in an interleaver means (INTERLE.) 52 before it is mapped to symbol in a symbol mapping means 53 for transmission. The transmission takes place after adding a training symbol sequence which is already known to the receiver side and which is specific to each transmitter and fed from a training symbol generator means 54 to the symbol sequence from the mapping means 53 at a position which precedes the symbol sequence in a multiplexer means 55. The signal sequence to be transmitted is converted into a high frequency signal to be radiated as a radio wave from an antenna.

MIMO receiver is disclosed, for example, in European laid open patent application EP12335655A2 (issued Aug. 21, 2002). The arrangement of a conventional MIMO receiver is shown in FIG. 2. Received signals from antennas #1 to #M are converted to baseband signals, fed as received signal $r_1$ to $r_M$ to be subject to an equalization processing in an MIMO adaptive equalizer 35, and an output from the MIMO adaptive equalizer 35 which corresponds to each transmitted sequence is decoded in one of decoders $62_1$ to $62_N$, respectively. The arrangement of the MIMO adaptive equalizer is shown in FIG. 3. Received signals $r_1$ to $r_M$ which are sampled from the baseband signal, a priori information sequence 2 ($\lambda 2_1$ to $\lambda 2_N$) which is fed back from an SISO decoder 63 and a channel status (propagation path response) estimate H are input to the adaptive equalizer 35. A replica of the undesired received signal is reproduced in a replica generator (REP. GEN.) 65 using the a priori information sequence 2 and the channel estimate. A subtractor 66 subtracts the replica from the received signal, thus reducing ISI (inter-symbol interferences) an MAI (inter-channel interferences). ISI and MAI which remain after this reduction processing are processed by an MMSE filter 67, and the logarithmic likelihood ratio of each symbol is calculated by an LLR generator 68 from the result of such processing to deliver a priori information sequence 1 ($\lambda 1_1$ to $\lambda 1_N$). In the decoders $62_1$ to $62_N$ in FIG. 2 which corresponds to each user (transmitter), the a priori information sequence 1 of each symbol which is calculated by the MIMO adaptive equalizer 35 is transformed into a bit sequence by a demapping part not shown in the drawing, and the bit sequence is deinterleaved in a deinterleaver (DEINTER.) 69, and the deinterleaved sequence is decoded by the SISO decoder 63. A soft decision output value sequence from the SISO decoder 63 is interleaved by an interleaver (INTERLE.) 71 and the output of the interleaver 71 is mapped by a mapping part not shown in the drawing and to obtain a soft decision symbol sequence which is supplied as a priori information sequence 2 ($\lambda 2_1$ to $\lambda 2_N$) to the MIMO adaptive equalizer 35. The described processings in the MIMO adaptive equalizer 35 and the SISO decoders $62_1$ to $62_N$ are repeated a plurality of times, and an eventual decoding result is delivered as a decided bit sequence $B_{seq1}$ to $B_{seqN}$. In the case where a symbol sequence is interleaved in the transmitting side, the priori information sequences 1 and 2 of the symbol sequence are also subjected to deinterleave and interleave, respectively, in the SISO decoders.

In order to achieve a satisfactory equalization in the MIMO adaptive equalizer 35 or to ensure that the inter-symbol interferences and inter-channel interferences be satisfactorily eliminated, it is important to detect a sampling timing of a received signal, a sync timing and to determine the duration of the equalization, or in other words, to detect a sync timing inclusive of a frame sync and symbol sync. However, this point is not disclosed in the European laid open patent application cited above. A conventional adaptive equalizer which would be used when a single user (transmitter) exclusively uses one channel (transmission path) for transmission is shown in FIG. 4. In order to form an equalization start timing signal, an equalization duration signal and a channel status estimate, a sync channel generator 81 precedes the adaptive equalizer 61. While not shown, a transmitting side initially transmits a long training symbol sequence (sync word signal), the transmitted symbol pattern of which is already known to a receiving side during each frame, and then transmits data representing an information content which is to be transmitted. While not shown, on the receiving side, a radio wave received from the transmitting side is received by an antenna, amplified and demodulated to be converted into a baseband received signal, which is then input to an input terminal 11. A sampling signal generator 19 forms a correlation between the received signal and a training symbol sequence TSS which is fed from a training sequence generator (TSS GEN.) 13, and a sampling timing is chosen at the time when the correlation value assumes a maximum value or when a received signal reaches from a path which provides a high received signal power. A received signal which is obtained with a sampling signal that is generated by the sampling signal generator 19 at this sampling timing is provided from a sampler 20 as a received signal having a digital sequence which is sampled. The correlation between the received signal having a digital sequence and the training symbol sequence TSS fed from the training sequence generator 13 is formed by a sync timing generator (TIMING GEN.) 12. The correlation signal produced by the sync timing generator 12 changes in a manner as illustrated in FIG. 5A, for example, and a timing ts is detected where the correlation signal Sigc is at its maximum, and is used as the sync timing ts. The sync timing signal which is produced at the timing ts, the digitized received signal, and the training symbol sequence TSS are input to a start timing/duration candidate signal generator 21 (START/DURA GEN.), which provides an equalization start timing signal and an equalization duration signal, both of which are input together with a sampled received signal to a channel estimator 28 (CHAN.EST.GEN.), which then estimates a transmission path response (channel status). The estimated channel status, the sampled received signal, the equalization start timing signal and the equalization duration signal are then input to an adaptive equalizer 61 where the sampled received signal is subject to an adaptive equalization processing to deliver a decided symbol sequence.

As shown in FIG. 5B which illustrates the equalization start timing ts and the equalization duration TE, of paths (or received signal samples) located across Ns symbols centered about the detected sync timing ts, those paths (samples) having a correlation output Sigc with the training symbol sequence which exceeds a given threshold value TH1 are designated as effective paths, the leading effective path (sample) position is defined as the equalization start timing t0 and the equalization duration signal TE is delivered as extending from the leading effective path (sample) to the last effective path (sample) position te. To determine which one of the paths represents an effective path, the threshold value TH1 may be chosen to be 1/Cp times a maximum correlation power MAX among the paths (samples) where Cp represents a predetermined constant, and samples equal to or exceeding TH1 may be determined as effective paths.

Up to the present time, a sufficient investigation is not made into the manner of determining the sync timing, the equalization start timing and the equalization duration in the MIMO receiver.

It is an object of the present invention to provide an MIMO receiver and an MIMO reception method which enable efficient detection of at least equalization start timing t0 allow a satisfactory adaptive equalization processing even when there are many signal sequences (users).

SUMMARY OF THE INVENTION

According to one aspect of the present invention, a detection of a sync timing and an equalization duration and a channel estimation are made. On the basis of the detected sync timing and the estimated channel status, a replica of a training symbol which exists in a received signal corresponding to a transmitted signal from each transmitter is formed. A replica of received training symbol from at least one transmitter other than an intended transmitter is subtracted from the received signal to form an interference suppression signal, which is then processed, as required, to be used in detecting at least the equalization start timing which is used in the equalization processing of the received signal from the intended transmitter.

With this arrangement, if there exist a plurality of transmitted signal sequences on a common frequency band concurrently, it is possible to achieve the detection of the equalization start timing and the equalization duration and the estimation of the channel status with a good accuracy.

DESCRIPTION OF EMBODIMENTS

For the ease of understanding the present invention, an MIMO receiver including the detection of the sync timing and the estimation of the channel status or including the sync/channel generator 81 which is proposed in a Japanese Patent Application (not yet known in the art) will be described first.

Figure 6:
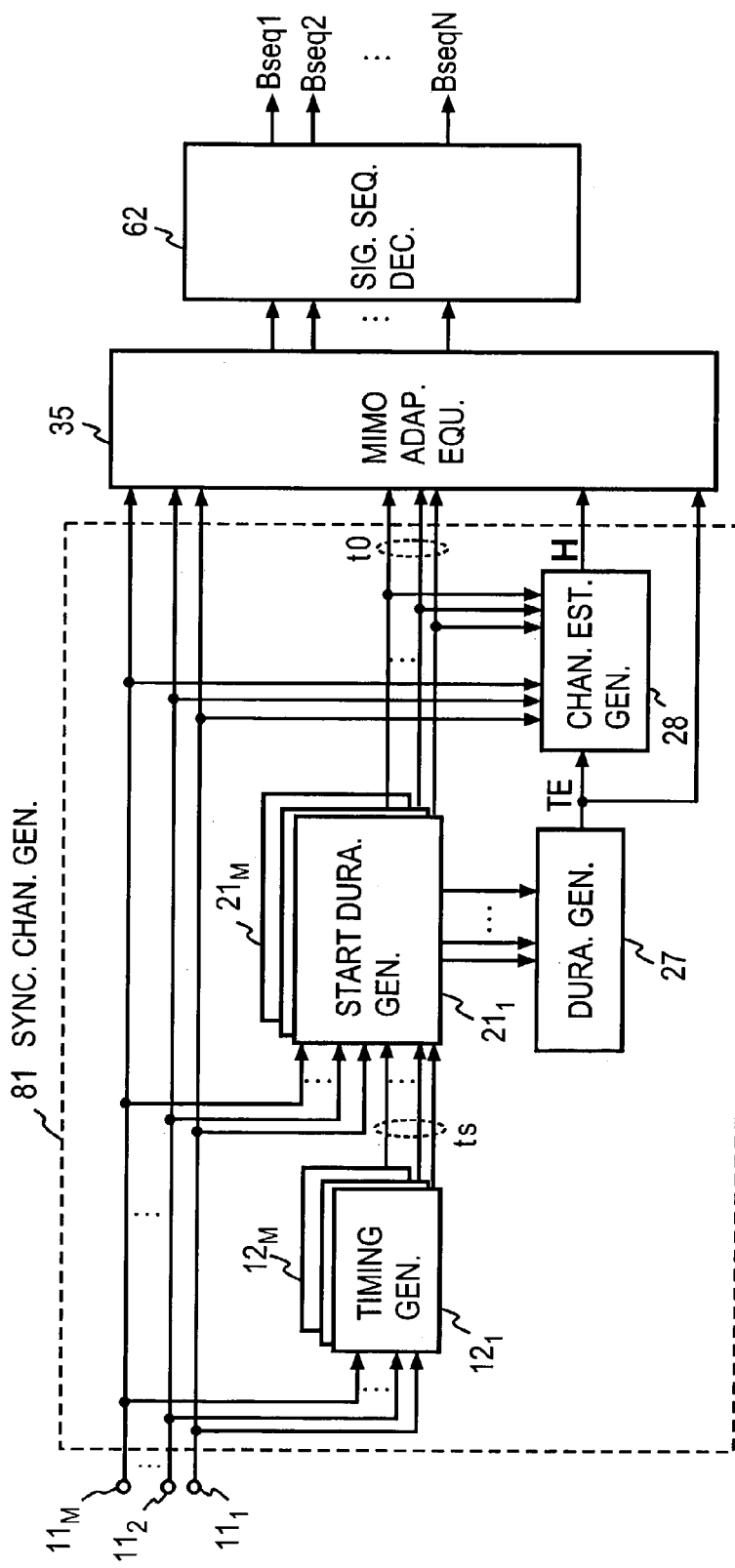
FIG. 6 is a diagram showing the arrangement of an MIMO receiver which is now proposed.

FIG. 6 shows an exemplary arrangement of the proposed MIMO receiver.

For received signals from input terminals $11_1$ to $11_N$ which have been received by a plurality of antennas (or sequences of digital values which are sampled from the baseband signal), the sync timing generators (TIMING GEN.) $12_1$ to $12_M$ detect a timing signal indicating the start of each frame and a sync timing signal synchronized with each symbol, by utilizing a received signal and a training symbol sequence which is produced in a receiver for each antenna. Hereinafter, a start timing of a frame and a symbol timing will comprehensively be referred to as a sync timing.

Figure 7:
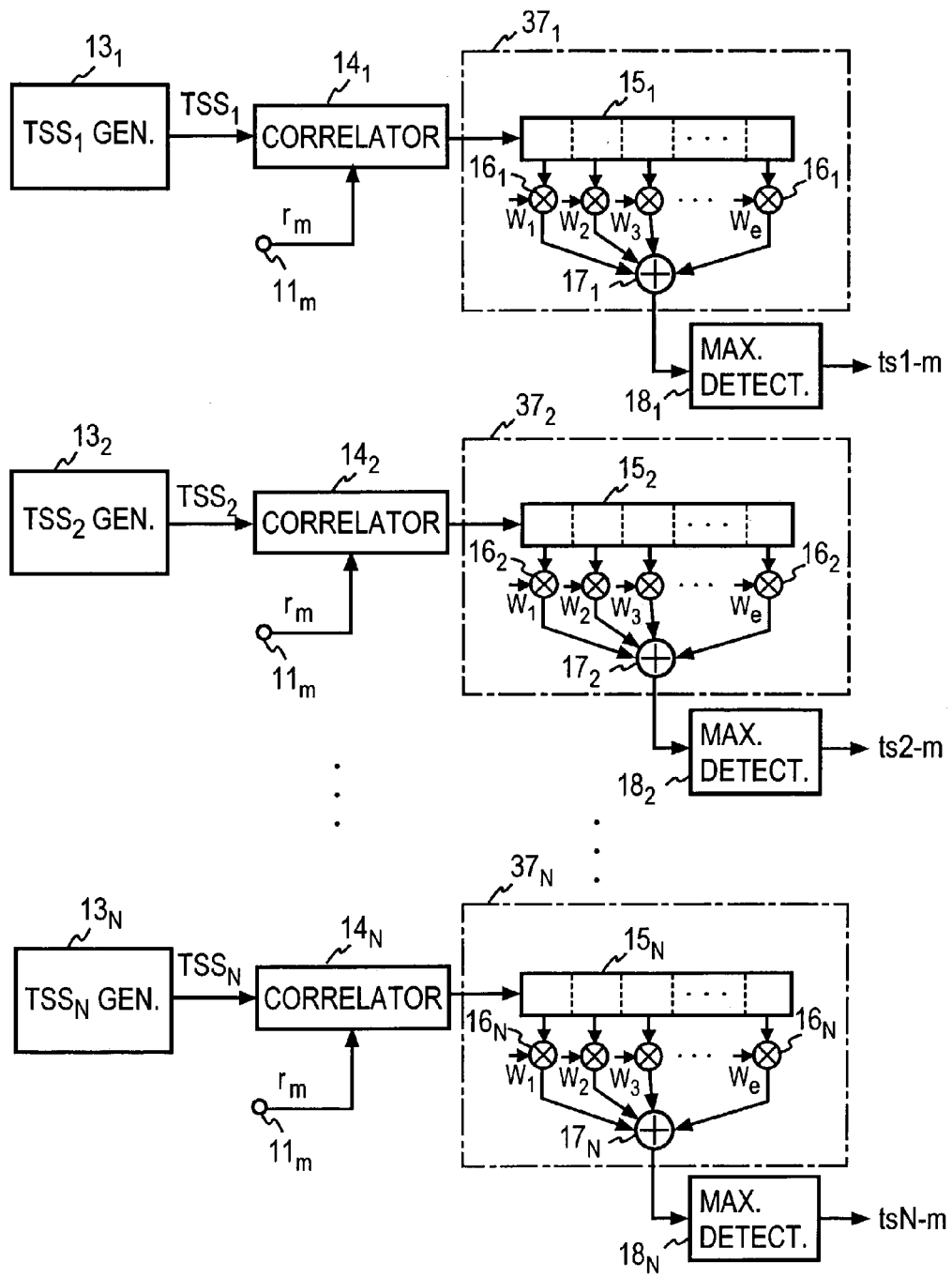
FIG. 7 is diagrams showing examples of the functional arrangement of a sync timing generator.

FIG. 7 shows an exemplary arrangement of a sync timing generator $12_m$ which operates upon a received signal $r_m$ from an antenna $A_m$ (m=1, . . . M). Describing the generation of a sync timing signal with respect to a transmitted signal from a transmitter TX1 of a user 1 (hereafter simply referred to as a signal from user 1) by way of example, a correlation between a received signal $r_m$ which passes from the antenna $A_m$ through the input terminal $11_m$ and a training symbol sequence $TSS_1$ which is fed from a training sequence generator $13_1$ and which is the same as the training symbol sequence transmitted from the transmitter TX1 is determined by a correlator $14_1$, and the correlation output is input to a shift resistor $15_1$ of a energy index generator 37. Weights $W_1 \ldots W_e$ are multiplied to the outputs from the respective shift stages of the shift resistor $15_1$ in multipliers $16_1$, and are added together in an adder $17_1$. In this manner, a weighted addition of the correlation outputs is made over a given time interval to determine a reception energy index. A detection of a maximum value of the reception energy indices is made in a maximum value detector (MAX.DETECTOR) $18_1$, and at a timing when the reception energy index assumes a maximum value, a sync timing signal ts1-m which is to act upon the signal from the user 1 which exists in the received signal from the antenna $A_m$ is delivered.

Figure 8:
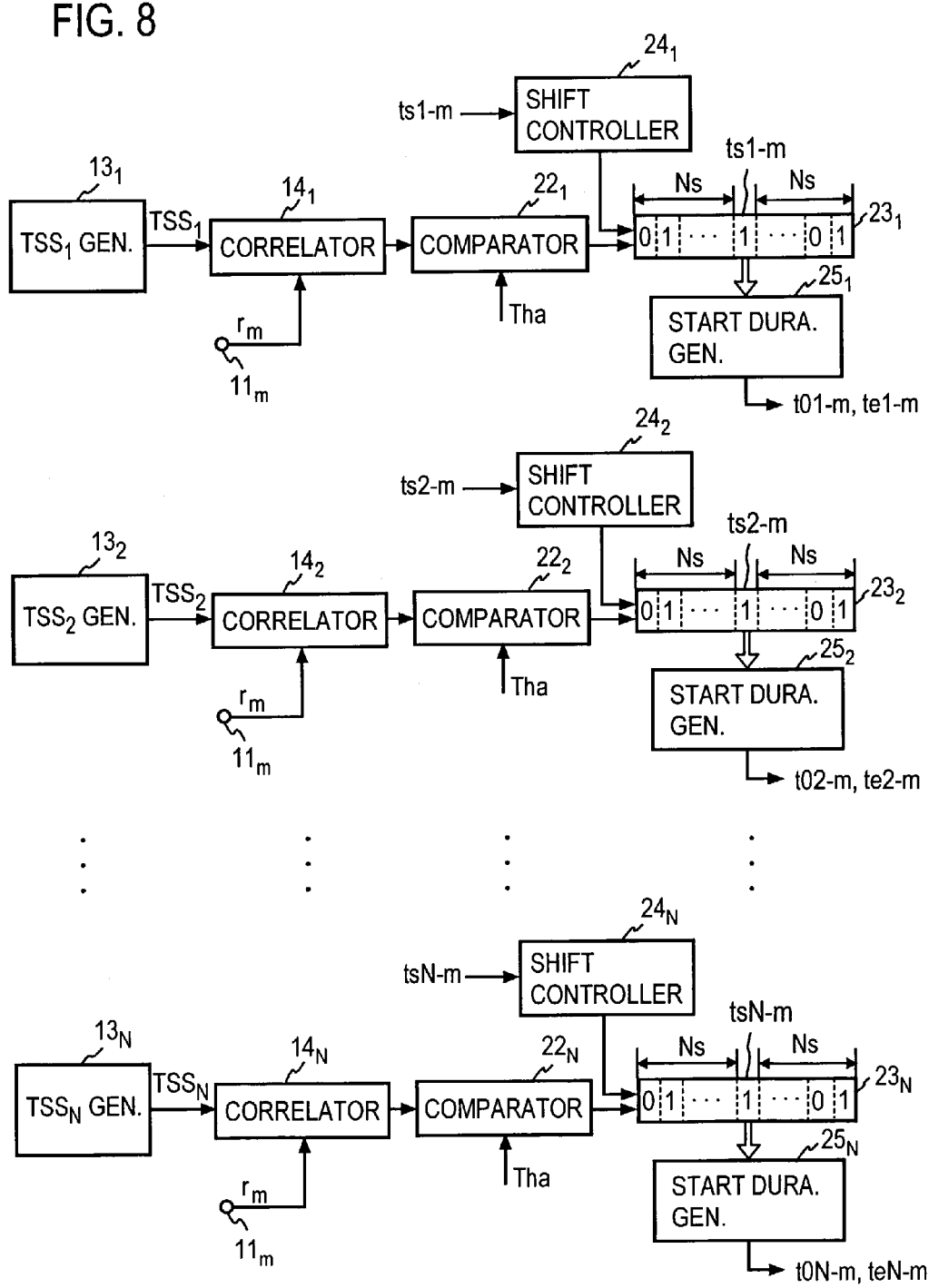
FIG. 8 shows diagrams illustrating examples of the functional arrangement of a start timing/duration candidate generator.

This sync timing and the received signal are then used to make a decision over the equalization start timings $t0_1$ to $t0_N$ and the equalization duration candidates $te_1$ to $te_N$ for the entire input signal sequences (received signal sequences which are transmitted from the transmitters) in start timing/duration candidate generator (START.DURA.GEN) $21_1$ to $21_M$ shown in FIG. 6. FIG. 8 shows an exemplary arrangement of a start timing/duration candidate generator $21_m$, again choosing the signal from the user 1 by way of example, a correlation between the received signal $r_m$ from the antenna $A_m$ (input terminal $11_1$) and a training symbol sequence $TSS_1$ from the training sequence generator $13_1$ for the user 1 is determined in the correlator $14_1$, and the correlation output and a threshold Tha are compared against each other in a comparator $22_1$. The comparator $22_1$ delivers "1" when the correlation output exceeds the threshold value Tha, and delivers "0" when the correlation output is less than the threshold value Tha. An output from the comparator $22_1$ is input to a shift resistor $23_1$. The shift resistor $23_1$ is controlled by a shift controller $24_1$ which receives a sync timing signal as an input in a manner such that outputs from the comparator $22_1$ at times located within $N_S$ symbols from the timing of the sync timing signal ts1-m are input to the shift resistor $23_1$. A start timing/equalization duration candidate detector $25_1$ delivers an equalization start timing signal t01-m for the signal from the user 1 which is contained in the received signal from the antenna $A_m$ at the earliest timing "1" is produced among (ts1-m±$N_s$) symbols which are located within the shift resistor $23_1$, and delivers a signal representing the length from t01-m to the latest timing "1" is produced as an equalization duration candidate signal te1-m. All of equalization duration candidate signals which are obtained for every antenna received signal for the transmitted signals from all the transmitters are input to an equalization duration signal generator (DURATION GEN.) 27 (FIG. 6), and a largest one among N×M equalization duration candidate signals is delivered as an equalization duration signal TE.

Figure 9:
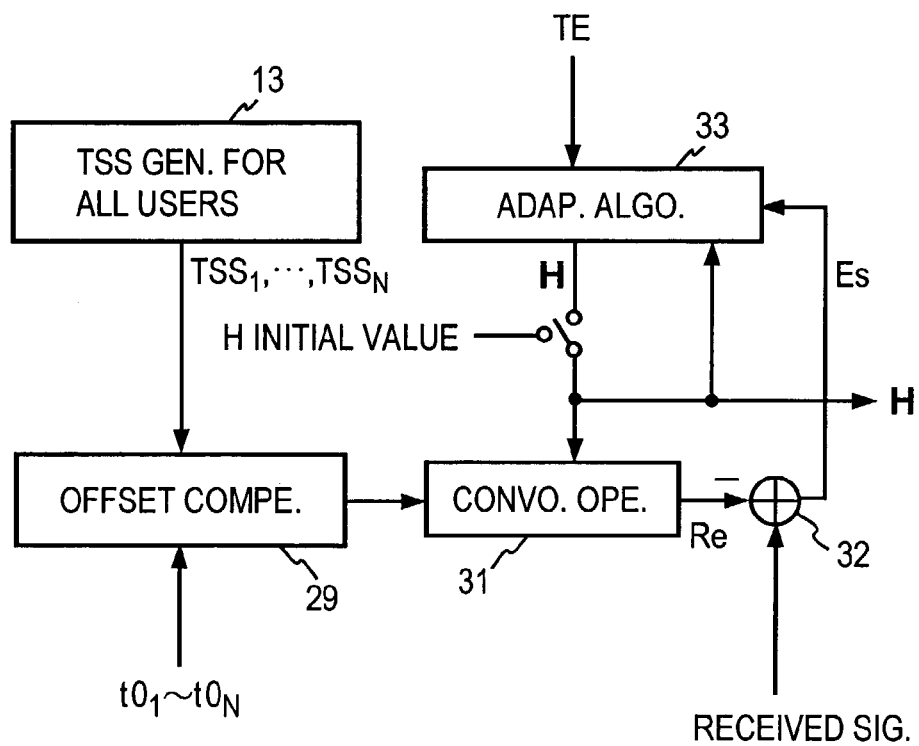
FIG. 9 is a diagram showing an exemplary functional arrangement of a channel estimator.

The equalization duration signal, the equalization start timing signal and the received signal are input to a channel estimator (CHAN.EST.GEN) 28 shown in FIG. 6, whereby a channel status (propagation path response and impulse response) H between each transmitter and each antenna is estimated. FIG. 9 shows an exemplary arrangement of the channel estimator 28. In the channel estimator 28, for the training symbol sequences $TSS_1, \ldots, TSS_N$ from all the transmitters which are supplied from the training sequence generator 13, the equalization start timing signals $t0_s$ to $t0_N$ are used to compensate for any offset in the reception timing between the transmitted signals from the transmitters in an offset compensators 29. A convolution integrator (CONVO OPE.) 31 performs a convolution integration of the channel status H which is supplied from an adaptive algorithm (ADAP.ALGO) 33 with the training symbol sequence in which any offset in the reception timing has been compensated for, thereby forming a replica Re of the received signal. A subtractor 32 subtracts the replica of the received signal from the received signal to determine an error signal. The adaptive algorithm 33 applies the adaptive algorithm to update the estimate of the channel status in a sequential manner using the error signal, the equalization duration signal and the previous channel estimate during the repetitive processing. The adaptive algorithm may comprise RLS algorithm, for example. Returning to the description of FIG. 6, the equalization start timing signals from the start timing/duration candidate generators $21_1$ to $21_M$, the equalization duration signal from the equalization duration generator 27, the estimated channel status from the channel estimator 28 and the received signals are input to the MIMO adaptive equalizer 35, whereby the received signals are subject to MIMO adaptive equalization processing, whereby estimated transmitted symbols from the respective transmitters are delivered.

Figure 1:
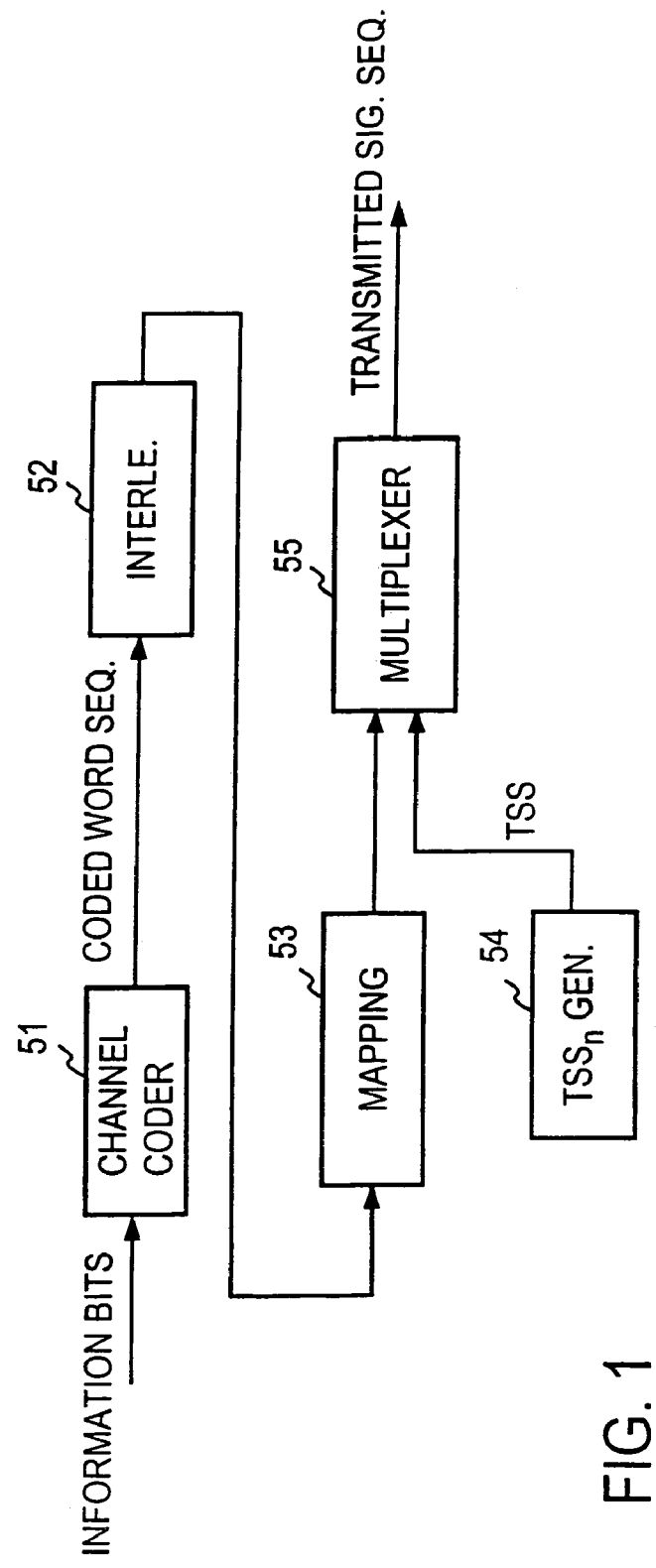
FIG. 1 is a diagram showing an exemplary arrangement of a transmitter which corresponds to a turbo-receiver.
Figure 2:
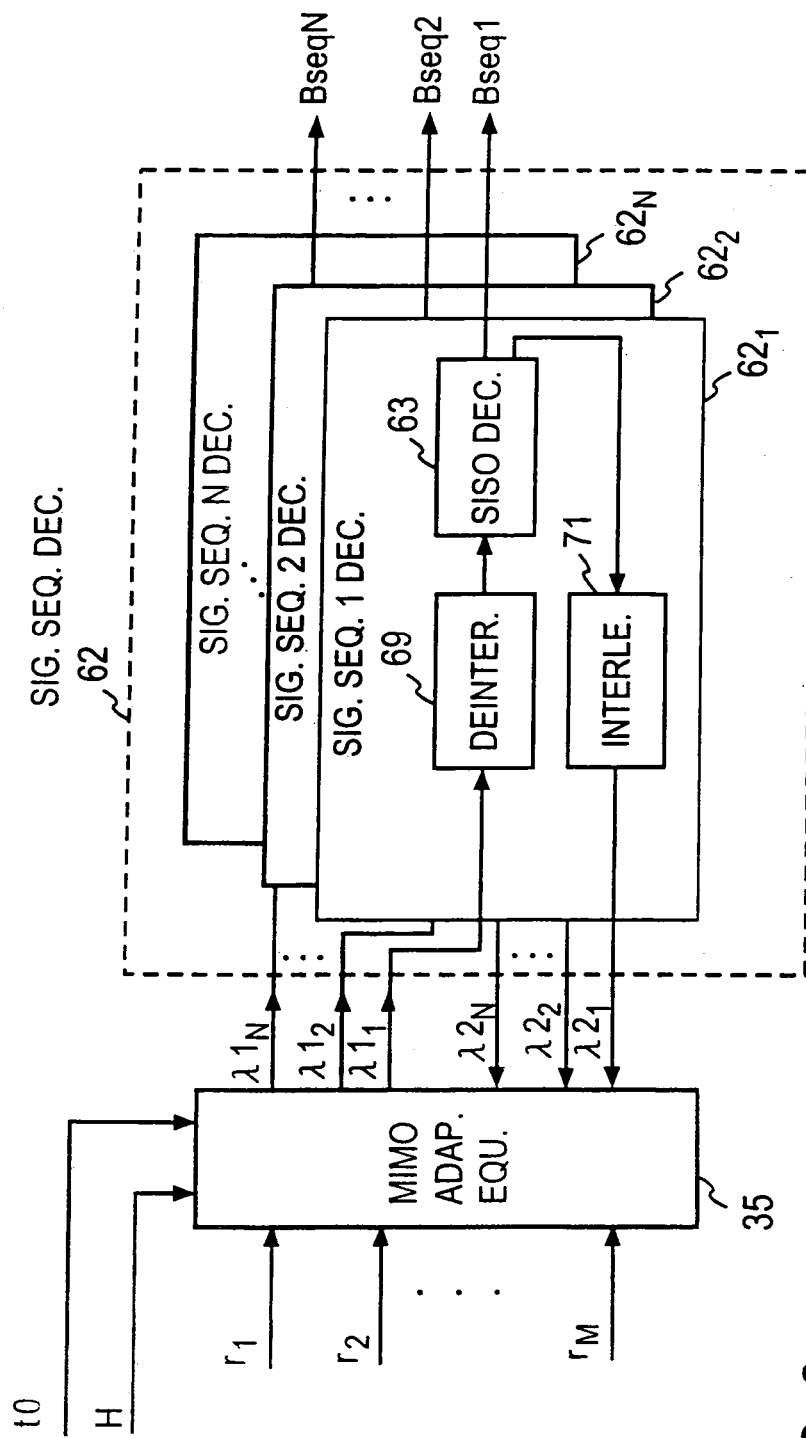
FIG. 2 is a diagram showing an exemplary functional arrangement of a MIMO turbo-receiver.
Figure 3:
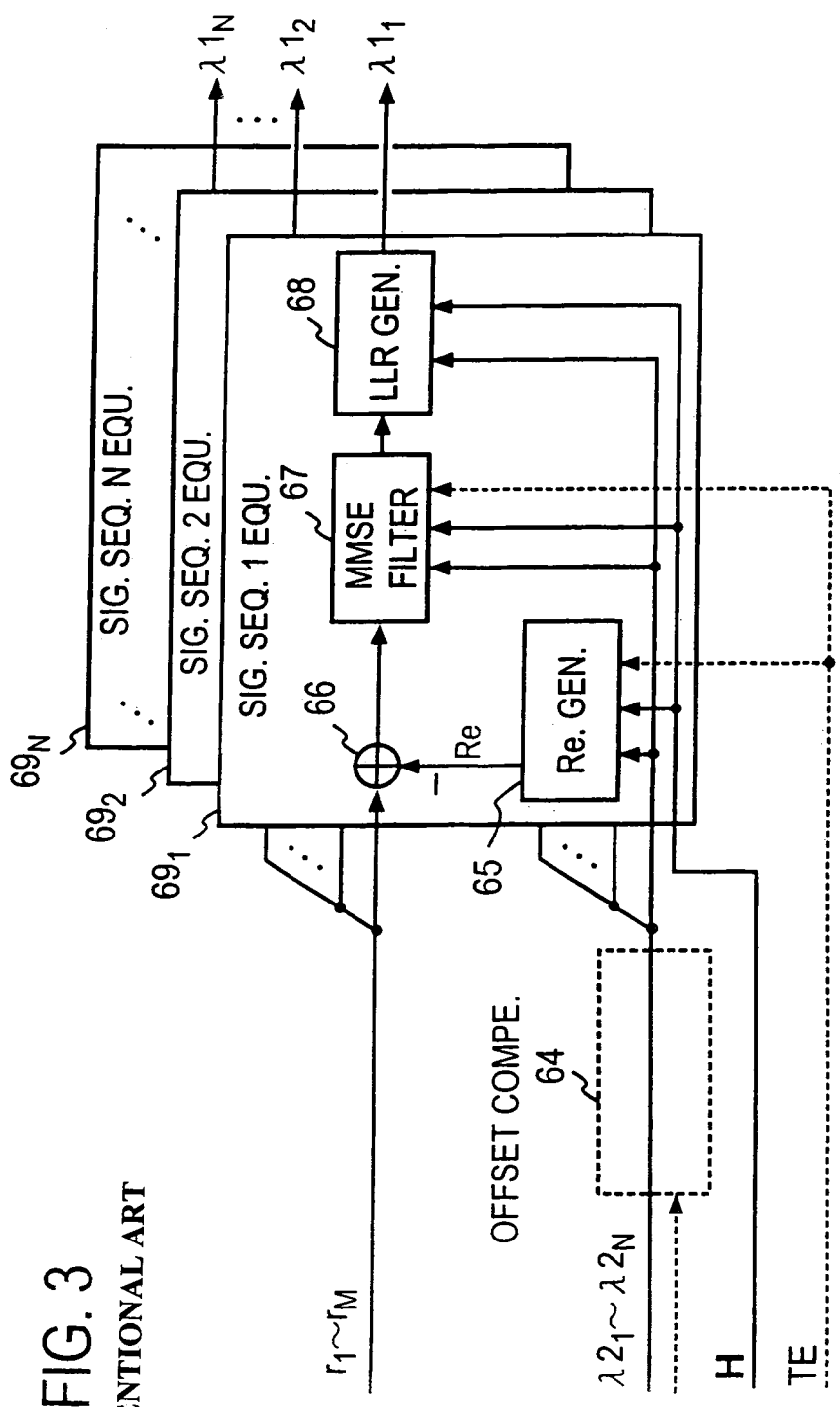
FIG. 3 is a diagram showing an exemplary functional arrangement of an MIMO adaptive equalizer.
Figure 4:
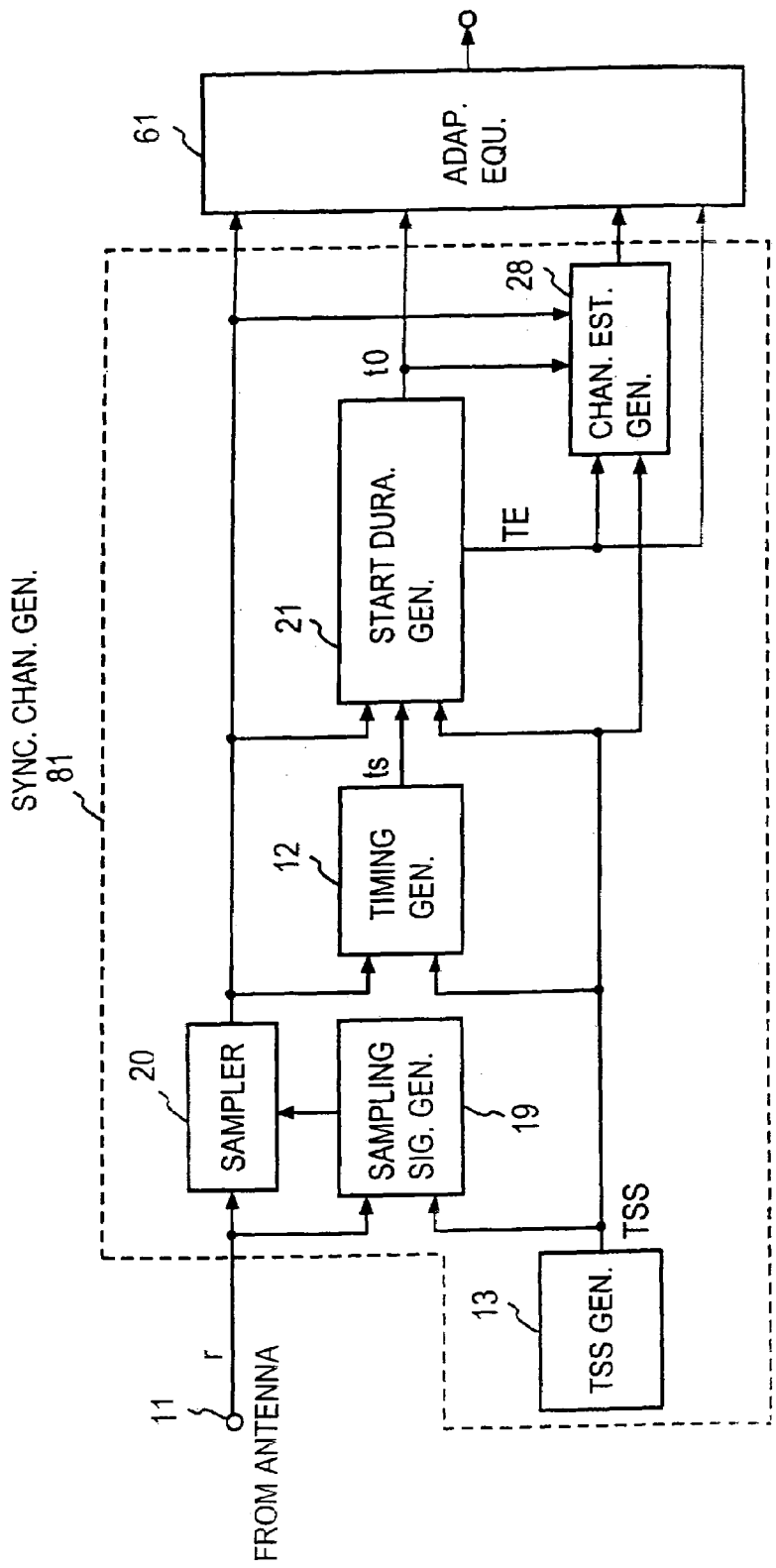
FIG. 4 is a diagram showing an functional arrangement of an adaptive equalizer for a single user.
Figure 5A:
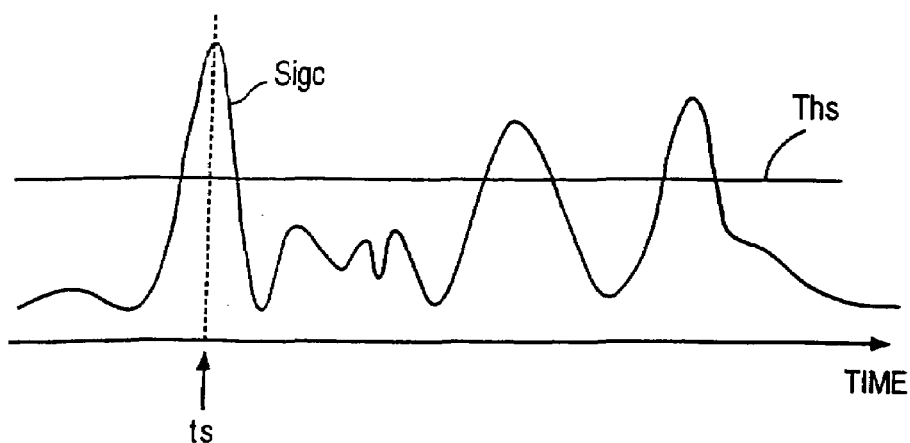
FIG. 5A illustrates a conventional manner of determining a sync timing.
Figure 5B:
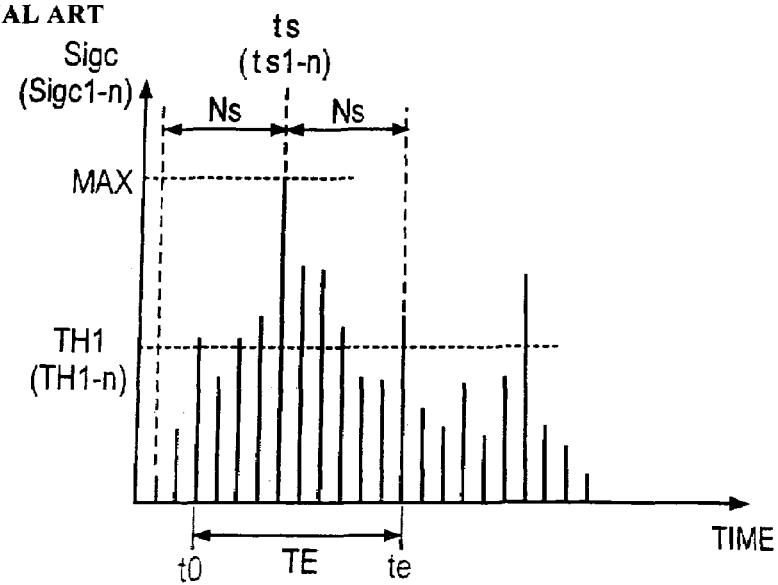
FIG. 5B illustrates a conventional manner of determining an equalization duration.

The functional arrangement of the MIMO adaptive equalizer 35 may be constructed as shown in FIG. 3, for example. While this has not been described in connection with FIG. 3 previously, as shown in broken lines in FIG. 3, a symbol offset compensator (OFFSET COMPE.) 64 may compensate for any offset between received user signals using equalization start timing signal upon the a priori information sequence to feed the replica generator 65, and the equalization duration signal TE is supplied to the replica generator 65 and the MMSE filter 67. Individual received user signals which have been separated by the equalization in the adaptive equalizer 35 are decoded by the signal sequence decoder 62 having a functional arrangement as shown in FIG. 2.

Figure 10:
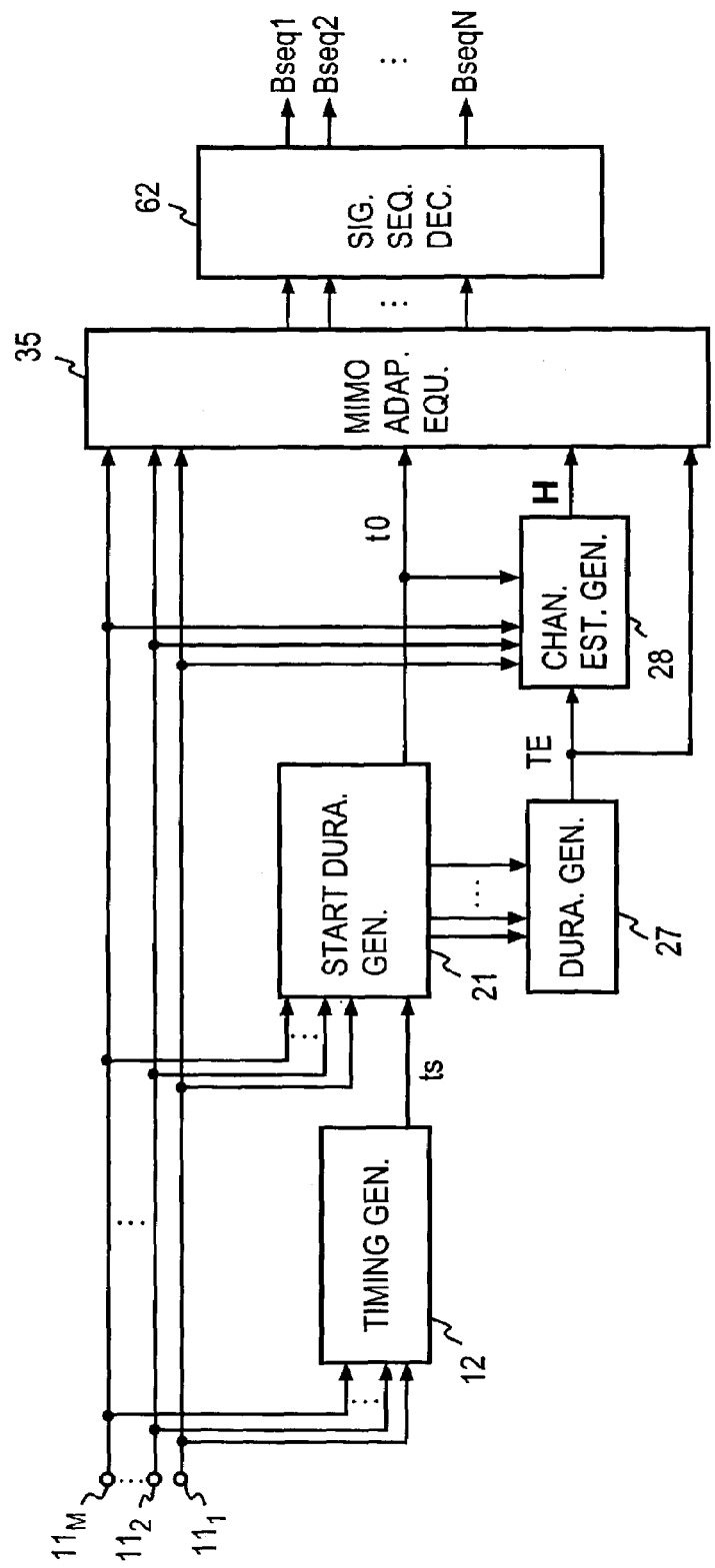
FIG. 10 is a diagram showing a functional arrangement of an MIMO receiver which is now proposed to produce an equalization start timing signal and an equalization duration candidate signal which are common between antennas.
Figure 11:
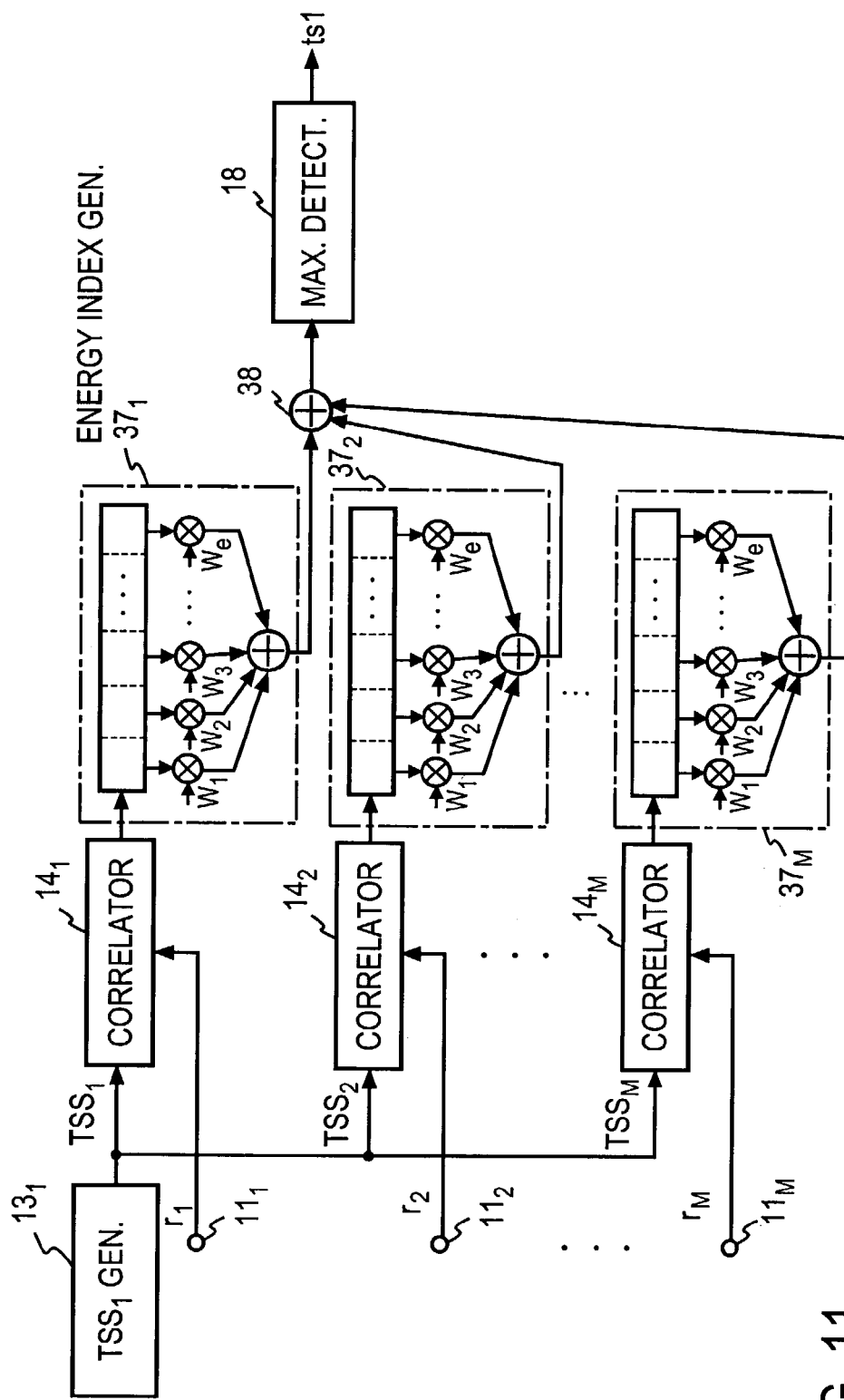
FIG. 11 is a diagram showing an exemplary arrangement of a sync timing generator shown in FIG. 10.

The method of detecting the symbol sync and determining the equalization duration which is proposed in the cited Japanese Patent Application before will now be described. FIG. 10 shows an another exemplary arrangement of the MIMO receiver. In this arrangement, in the event that the sync timing, the equalization start timing and the equalization duration candidate are similar between the received signals from the antennas $A_1$ to $A_M$, these may be assumed to be common between the received signals from these antennas, and the signals which are received by the all antennas may be used to determine them. FIG. 11 shows the arrangement of the sync timing generator 12 which operates on the signal from the user 1. Initially, a correlation output between the signal $r_1$ to $r_M$ received by each antenna which is fed from the input terminals $11_1$ to $11_M$ and the training symbol sequence $TSS_1$ from the training sequence generator $13_1$ for the user 1 is determined by the correlators $14_1$ to $14_M$, respectively, and the energy index generators $37_1$ to $37_M$ apply a weighted addition of these correlation outputs over a given time interval to generate a energy index. Subsequently, a sum of the energy indices which are obtained for the antenna received signal at the time each received signal is sampled is determined by an adder 38, and a maximum value detector 18 detects the timing when the sum of the energy indices is at its maximum, and delivers a sync timing signal ts1 for the signal from the user 1 at this time.

Figure 12:
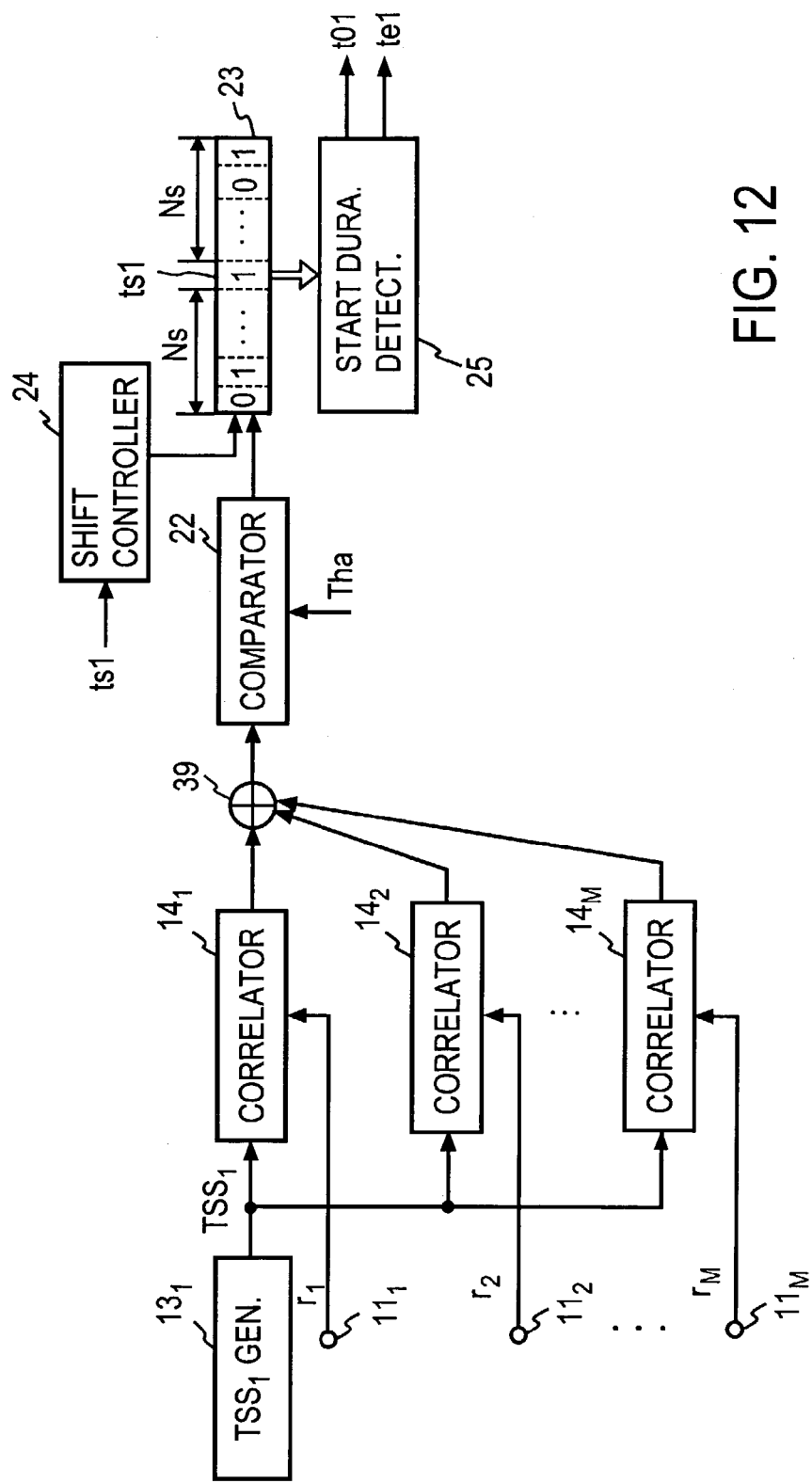
FIG. 12 is a diagram showing an exemplary arrangement of a start timing/duration candidate generator shown in FIG. 10.

Subsequently, the sync timing which is obtained in this manner for the signal from each user and the received signal are used to make a decision over the equalization start timing and the equalization duration candidates for all the input signal sequences in a start timing/duration candidate generator (START.DURA.GEN.) 21 (FIG. 10). FIG. 12 shows the arrangement of a start timing/duration candidate generator (START.DURA.GEN.) 21 for the signal from the user 1. Correlations between the received signals $r_1$ to $r_M$ from the respective antennas which are fed from the input terminals $11_1$ to $11_M$ and the training symbol sequence for the user 1 which is fed from the training sequence generator $13_1$ are formed in correlators $14_1$ to $14_M$, respectively, and a sum of correlation outputs from all the received antenna signals at respective sampling points is determined in an adder 39. The sum of the correlation outputs and the threshold value Tha are compared against each other in the comparator 22, and the comparator 22 delivers "1" when the correlation output is greater than the threshold value Tha, and delivers "0" when the correlation output is less than the threshold value Tha. An output from the comparator 22 is input to the shift resistor 23. The shift resistor 23 is controlled by a shift controller 24 which receives the sync timing signal as an input in a manner such that outputs from the comparator 22 which occur in a time interval corresponding to Ns symbols before and after the sync timing ts1 are input to the shift resistor 23. The start timing signal/equalization duration candidate detector 25 delivers the equalization start timing signal t01 for the signal from the user 1 at the earliest timing "1" is produced within the time interval of (ts1±$N_s$) symbols, and delivers a signal extending from t01 to the latest timing "1" is produced as the equalization duration candidate signal te1.

The equalization duration candidate signals for the received signals from all the antenna which cover each transmitter are input to the duration generator 27 (FIG. 10), and the largest one among all the equalization duration candidate signals which are input is delivered as the equalization duration signal. Subsequently, in the similar manner as the equalization start timing signal and the equalization duration signal are determined from each received signal from the antenna, the channel estimator 28 estimates the channel status between each transmitter and each antenna, using the equalization duration signal from the duration generator 27, the equalization start timing signal from the start timing/duration candidate generator 27 and the received signal. In addition, the equalization start timing signal, the equalization duration signal and the estimated channel status are used in the MIMO adaptive equalizer 35 to apply an MIMO adaptive equalization to the received signal, thus estimating the transmitted signal from each transmitter and separately delivering them. The delivered outputs are decoded in the signal sequence decoder 62.

The proposed method of detecting the sync timing and determining the equalization duration which has been considered above is still susceptible to the likelihood of significantly erring the sync timing and the equalization duration. If the equalization duration becomes unnecessarily longer, it causes an increase in the wasteful calculation, and if the equalization duration is too short, a degradation in the equalization capability results. In particular, when the number N of transmitted signal sequences increases, it is considered that the accuracy of establishing synchronization, the accuracy of determining the equalization duration and the accuracy of the channel estimation will be greatly degraded due to interferences between the input signal sequences. For this reason, in the MIMO system, the number of training symbols which are required to obtain a given signal response must be increased in comparison to the use of a single transmitted signal sequence which is received. Embodiments of the present invention will now be described.

First Embodiment

Figure 13:
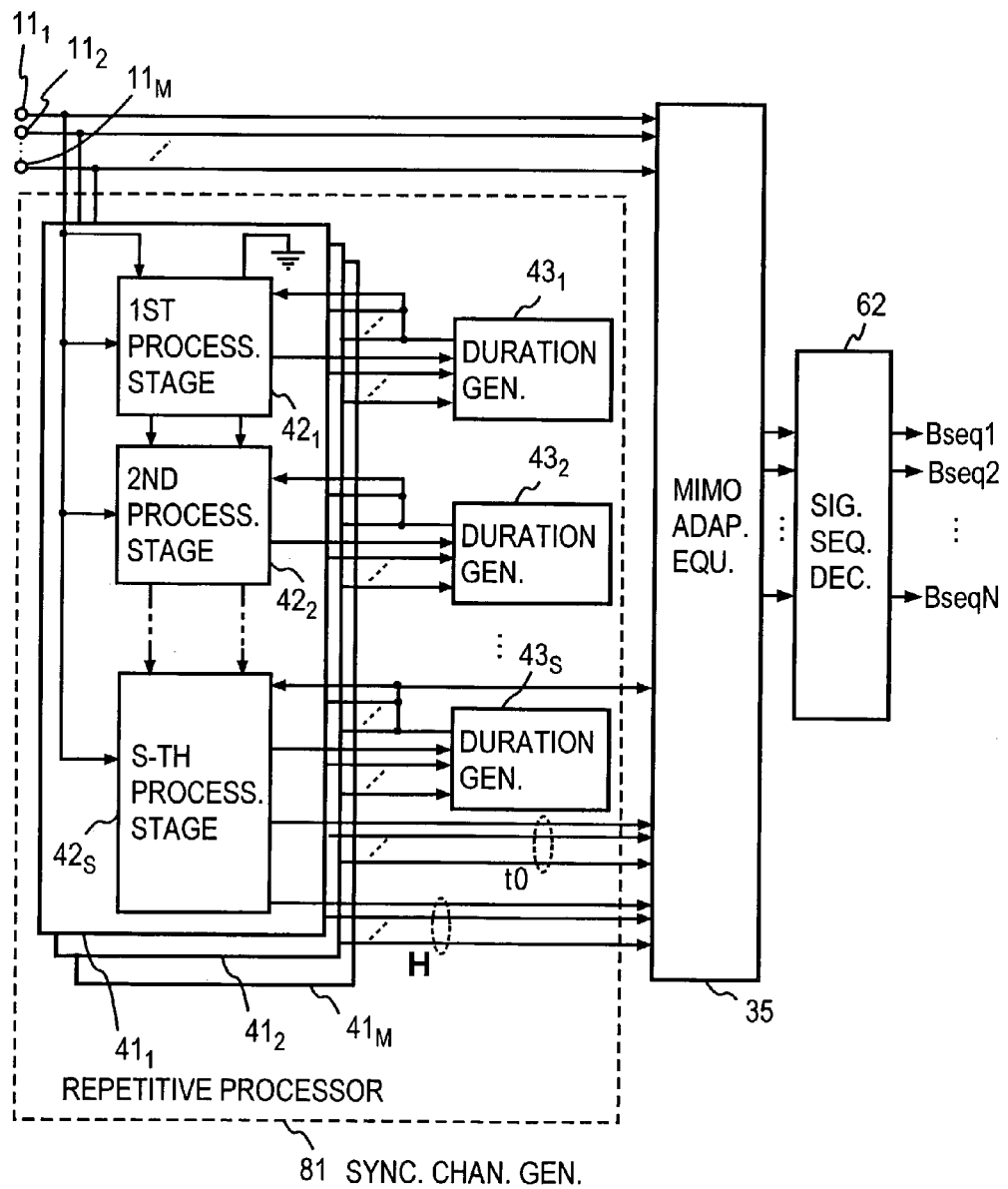
FIG. 13 is a diagram showing a functional arrangement of a receiver according to a first embodiment of the present invention.

On the transmitting side, N transmitters TX1 to TXN perform transmission of signals on a common frequency concurrently. In addition, each transmitter transmits a training symbol sequence which is intrinsic to each transmitter and is already known to the receiving side. FIG. 13 shows a first embodiment of the present invention. Here, it is assumed that a received signal is demodulated to be converted into a baseband signal and that a signal in the form of a digital sequence is input to input terminals $11_1$ to $11_M$. In a sync/channel generator 81, a repetitive processor $41_m$ which is provided for each antenna $A_m$ (m=1, . . . , M) operates to generate an equalization start timing signal, to generate an equalization duration signal and to perform a channel estimation for received signals which are received by a plurality of antennas. Each repetitive processor $41_m$ comprises a plurality of processing stages $42_s$ (s=1, . . . , S) which are in cascade connection. Each processing stage $42_s$ receives as inputs a replica of a received signal which is generated by an immediately preceding processing stage $42_{s-1}$ and an error signal $E_s$ which is equal to the received signal from which the replica of the received signal is subtracted, and generates an equalization start timing signal, an equalization duration signal, a channel status and a reception replica for the received signals from all the transmitters, delivers the equalization duration signal, and delivers the generated replica of the received signal and the error signal $E_s$ which is equal to the received signal from which the replica of the received signal is subtracted to the immediately following processing stage $42_{s+1}$. Since it is desirable that the equalization duration be uniform for the received signals from all the antennas, an equalization duration signal generator $43_s$ which is common to the repetitive processors $41_1$ to $41_M$ is provided for each processing stage $42_s$ so that each processing stage $42_s$ in the respective repetitive processor $41_1$ to $41_M$ inputs an equalization duration candidate signal to the equalization duration signal generator $43_s$, which in turn determines a longest one among these candidates to be an equalization duration signal, which is returned to each processing stage $42_s$ in the respective repetitive processors $41_1$ to $41_M$.

Figure 14:
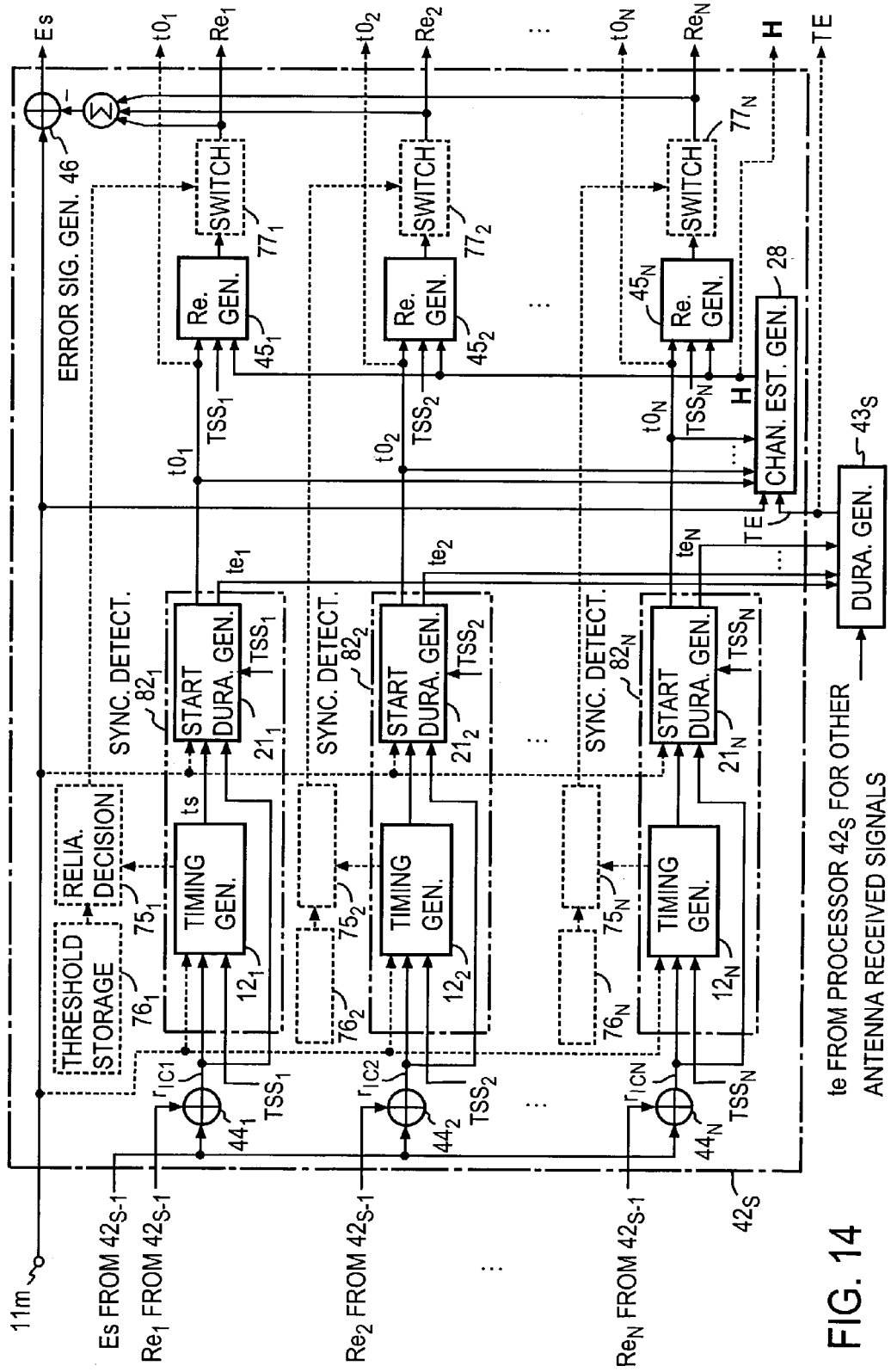
FIG. 14 is a diagram showing an exemplary functional arrangement of a processing stage 42$_s$ shown in FIG. 13.

FIG. 14 shows an exemplary functional arrangement of an s-th processing stage $42_s$ in the repetitive processor $41_m$ which operates on the received signal from the antenna $A_m$. Here, the description deals with the processing of the signal from a user 1 (received signal from transmitter TX1) by way of example. First of all, an error signal which is formed by subtracting a received signal replica for all the received user signals which is generated by an (s−1)-th processing stage (or previous processing stage) $42_{s-1}$ is added with a received signal replica for the signal from the user 1 which is formed in the previous processing stage $42_{s-1}$ (which will be referred to as a received signal replica for the user 1, and this denotation applies similarly to other instances) $Re_1$ in an adder $44_1$. This addition output signal represents an interference suppression (user 1) received signal $r_{IC1}$ which is equal to the received signal from which the received signal replicas $Re_2$ to $Re_N$ for other than the user 1 are subtracted, and this interference suppression received signal $r_{IC1}$ is used in a sync timing generator (TIMING GEN.) $12_1$ to generate a sync timing signal. The sync timing signal which is generated in this manner and the interference suppression received signal from the adder $44_1$ is input to a start timing/duration candidate generator (START/DURA. GEN.) $21_1$ to generate an equalization start timing signal $t0_1$ and an equalization duration candidate signal $te_1$ in the sync timing generator $12_1$. The sync timing generator $12_1$ and the start timing/duration candidate generator $21_1$ may be constructed in the similar manner as the portion shown in FIG. 7 which detects the sync timing signal ts1-m and the portion shown in FIG. 8 which detects the equalization start timing signal t01-m and the equalization duration candidate signal te1-m.

The equalization duration candidate signal generated in the manner mentioned above is input to an equalization duration generator (DURATION GEN.) $43_s$ together with equalization duration candidate signals obtained from the start timing/duration candidate generators $21_2$ to $21_N$ in response to the interference suppression received signals $r_{IC2}$ to $r_{1CN}$ for other users (2 to N) and equalization duration candidate signals which are similarly obtained in the s-th processing stage $42_s$ in response to other antenna received signals. The equalization duration generator $43_s$ delivers a longest one of all these equalization duration candidate signals which are input as the equalization duration signal. This equalization duration signal is input to a channel estimator 28 together with the equalization start timing and the received signal in order to estimate the channel status. The construction of the channel estimator 28 may be similar to that shown in FIG. 9.

Figure 15:
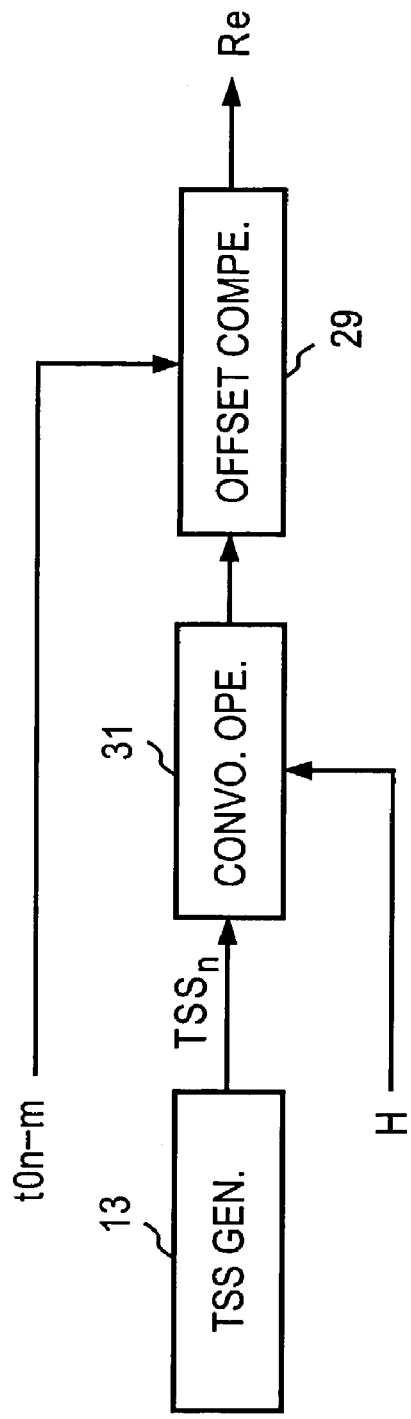
FIG. 15 is a diagram showing an exemplary functional arrangement of a replica generator 45 shown in FIG. 14.

The equalization start timing signal $t0_1$, the equalization duration signal $te_1$, the estimated channel status H, and the training symbol sequence $TSS_1$ for the user 1 are input to a replica generator (REP.GEN.) 45 where a received signal replica $Re_1$ for the user 1 (or from the transmitter TX1) is generated. FIG. 15 shows an exemplary arrangement of the replica generator 45. A channel status estimate from the channel estimator 28 and a training symbol sequence $TSS_n$ (n=1, . . . , N) from the training sequence generator 13 are fed to a convolution integrator (CONVO.OPE.) 31 to be subject to a convolution integration. The equalization start timing signal t0n–m is applied to its output to compensate for an offset in the sync timing between the user received signals in an offset compensator 29, thus generating a replica for the received signal from a user n. Replicas for the received signals from all the users 1 to N (transmitters TX1 to TXN) which are generated in the replica generators $45_1$ to $45_N$ in this manner are subtracted from the received signal from the antenna $A_m$ in an error signal generator 46, thus generating an error signal.

The channel status estimates, replicas $Re_1$ to $Re_N$ for the training symbols in the user signals, and the error signal which is generated by subtracting replicas $Re_1$ to $Re_N$ from received signal for the training symbols in the user signals are then fed to a following processing stage $42_{s+1}$. The described processing is repeated also in the processing stage $42_{s+1}$ to update the replica for the training symbol in the received signal, thus improving the accuracy of detecting the equalization start timing and the equalization duration and the accuracy of estimating the channel status estimate.

The equalization start timing signal, the channel status estimate and the equalization duration signal which are generated in the final processing stage $42_s$ for each user received signal as well as the received signal are input into an MIMO adaptive equalizer 35 (FIG. 13) where the transmitted symbols for each user (transmitter) are estimated and delivered.

In the first processing stage (initial stage) $42_1$, the adders $44_1$ to $44_N$ shown in FIG. 14 are omitted, and a received signal from the input terminal $11_m$ is fed to the sync timing generators $12_1$ to $12_N$ and the start timing/duration candidate generators $21_1$ to $21_N$ in the repetitive processor $41_m$ as shown in broken lines while the S-th processing stage 42 (final processing stage) merely delivers the equalization start timing signal, the channel status estimate H and the equalization duration signal. At least two stages are provided for the processing stage 42.

Second Embodiment

In the first embodiment, the received signal from the input terminal $11_m$ is used in the estimation of the channel status, and this takes place in a collective manner for all the user received signals. In the second embodiment of the present invention, the channel estimator in the second processing stage $42_e$ and subsequent stages uses the interference suppression received signal $r_{IC}$ which is equal to the received signal from which received signal replicas for other than the desired user received signal are subtracted in order to estimate the channel status for each user received signal. When the channel status is estimated for each user received signal, it is possible to reduce the number of parameters which must be estimated by a factor which is equal to the number of user signals, thus allowing the rate of convergence of the channel status estimate to be increased and permitting the estimation of the channel status to be completed with a reduced number of training symbols.

Figure 16:
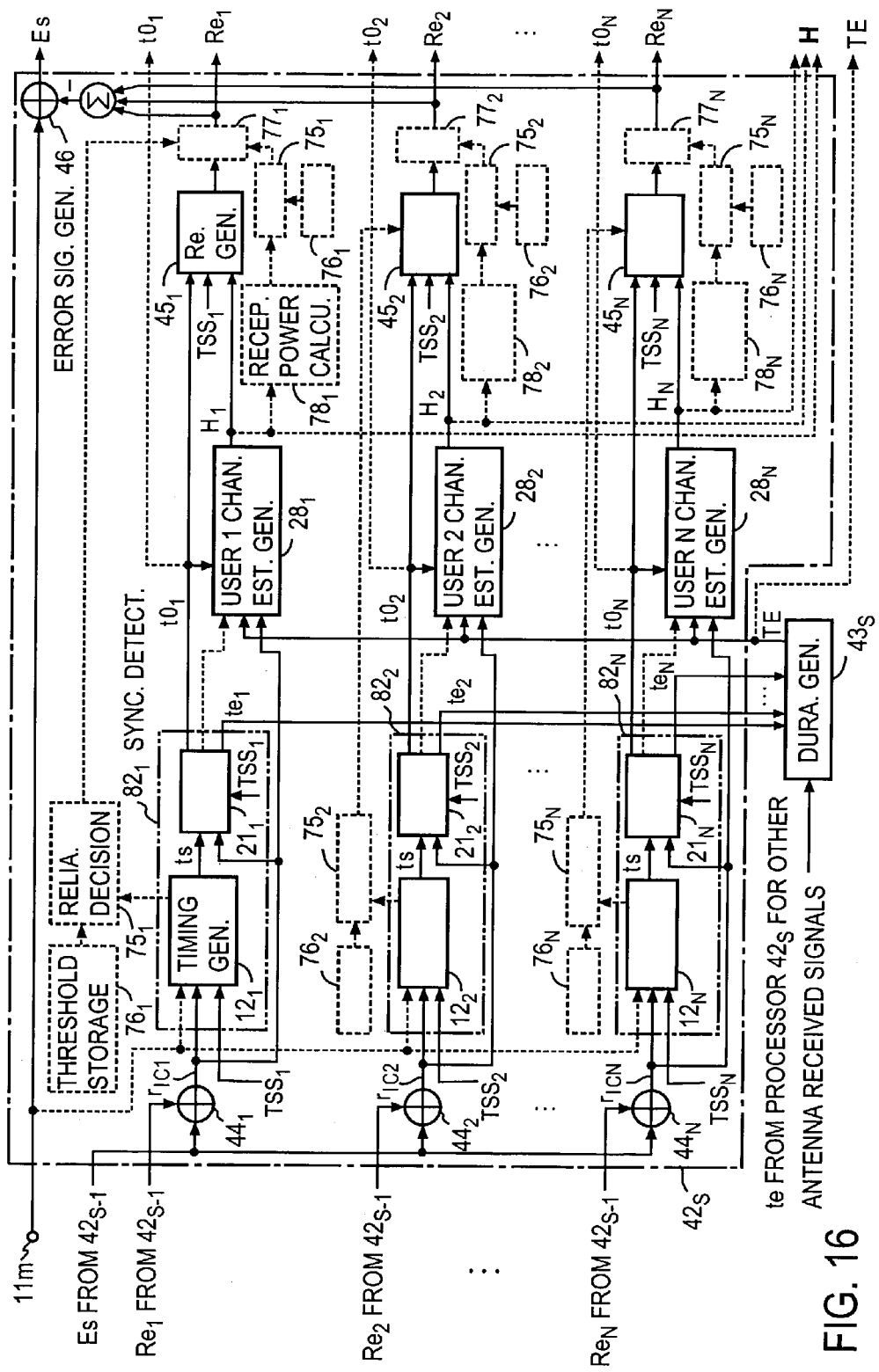
FIG. 16 is a diagram showing an exemplary functional arrangement of a processing stage 42$_s$ according to a second embodiment of the present invention.

FIG. 16 shows a functional arrangement of the second processing stage $42_2$ and subsequent processing stages in the second embodiment, using similar reference numbers to designate portions which corresponds to those shown in FIG. 14. A distinction over the first embodiment is only the fact that the channel estimator is provided as channel estimators $28_1$ to $28_N$ for each user signal, and in other respects, the arrangement is similar to that shown in FIG. 14.

Figure 17:
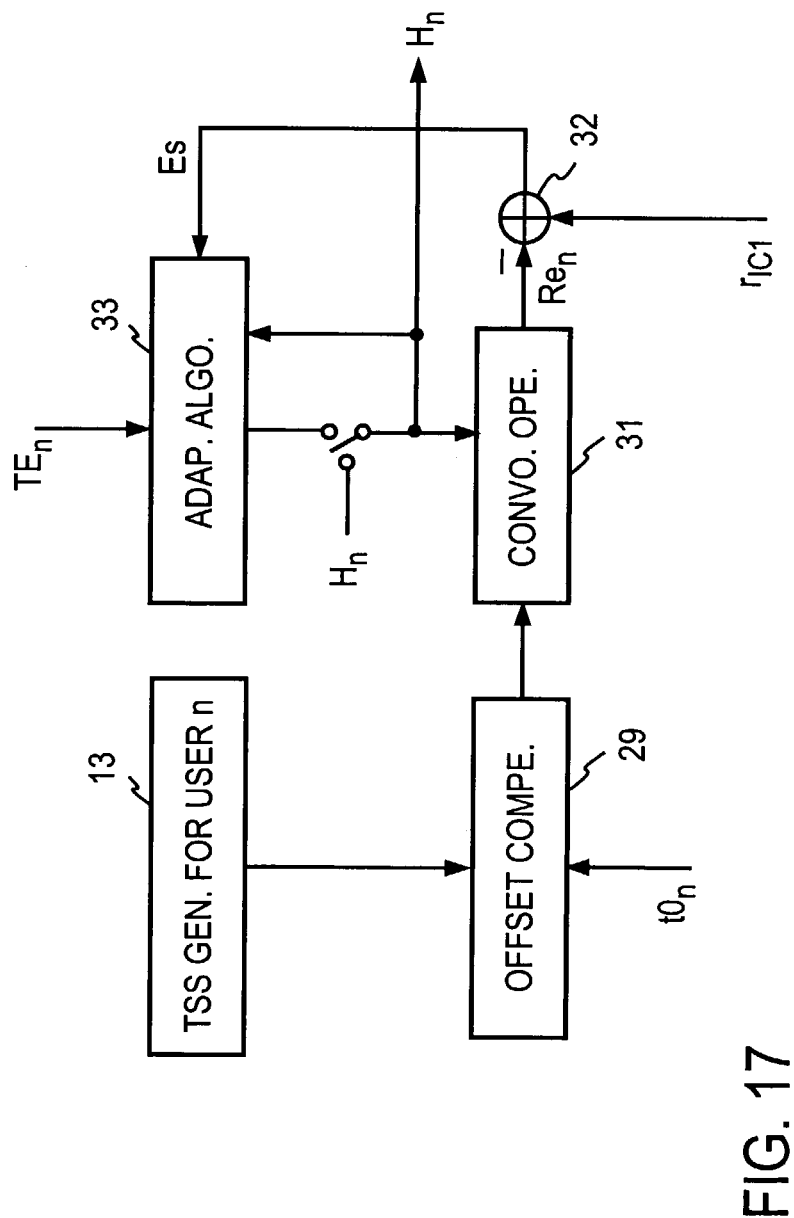
FIG. 17 is a diagram showing an exemplary functional arrangement of a channel estimator 28 shown in FIG. 16.

FIG. 17 shows the arrangement of the channel estimator $28_n$ for each user signal. A distinction over the channel estimator shown in FIG. 9 in which the estimation of the channel status occurs for all the user signals resides in the fact that the equalization start timing signal which is input and the training symbol sequence which is generated, the channel status estimate and the received signal replica are only those which correspond to a desired user n. In other respects, the arrangement and the operation remain similar as when the estimation of the channel status takes place for all the user received signals.

Third Embodiment

Figure 18:
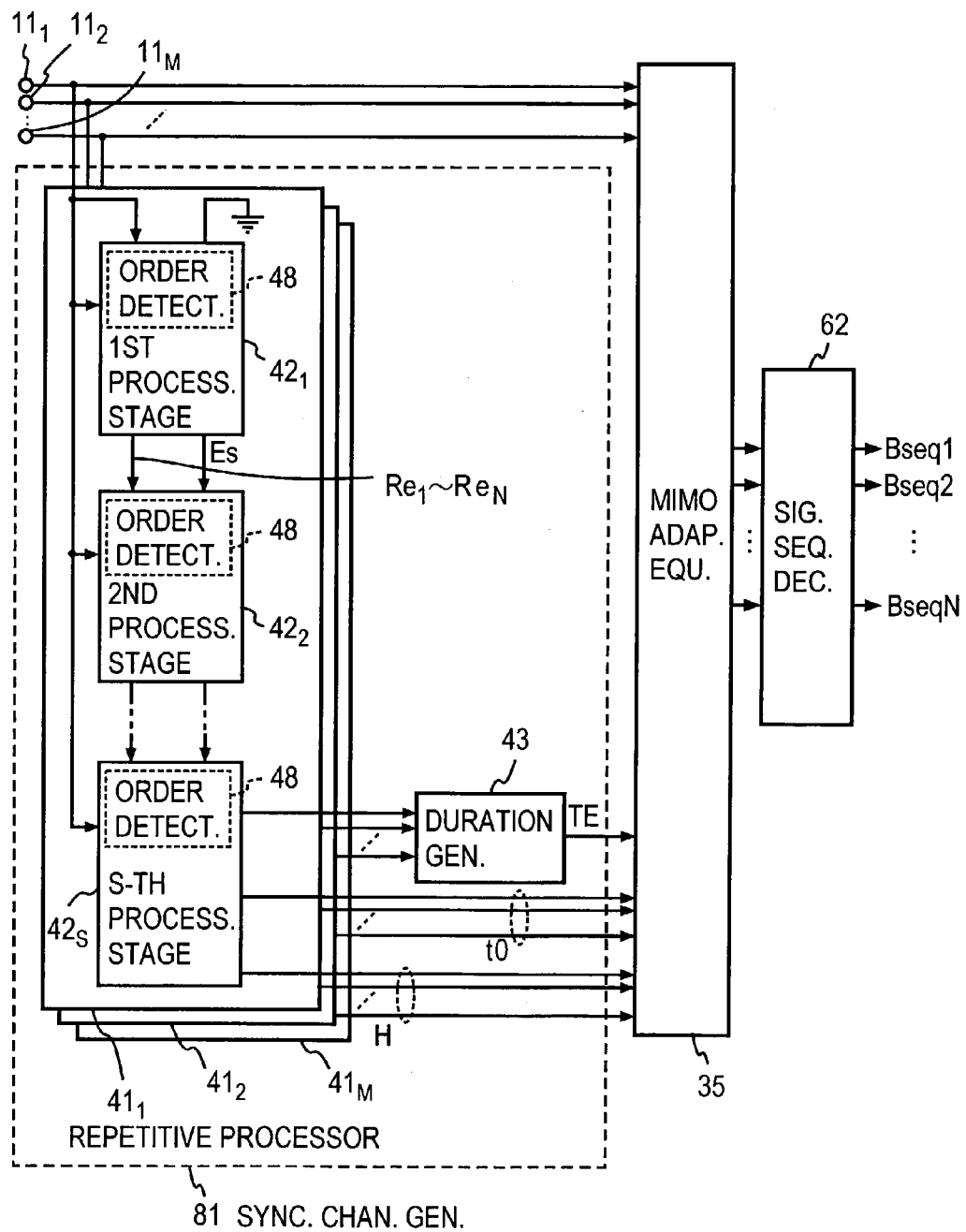
FIG. 18 is a diagram showing an exemplary functional arrangement of a receiver according to a third embodiment of the present invention.

In the third embodiment of the present invention, the estimation of the channel status takes place by using the equalization duration candidate signal which is obtained for each user signal during the estimation of the channel status in the second embodiment. FIG. 18 shows an arrangement which serves this purpose. A distinction over the arrangement of the second embodiment resides in the fact that the equalization duration generator $43_s$ for each processing stage $42_s$ is omitted and that the s-th processing stage $42_s$ is constructed as shown in broken lines in FIG. 16 so that the equalization duration candidate signals from the start timing/duration candidate generators $21_1$ to $21_N$ for respective users are input to channel estimators $28_1$ to $28_N$, respectively. In other respects, the arrangement is similar to the second embodiment. Each of the equalization duration candidate signals is fed from only the S-th processing stage (final processing stage) $42_S$ to the equalization duration generator 43 shown in FIG. 18.

Fourth Embodiment

Figure 19:
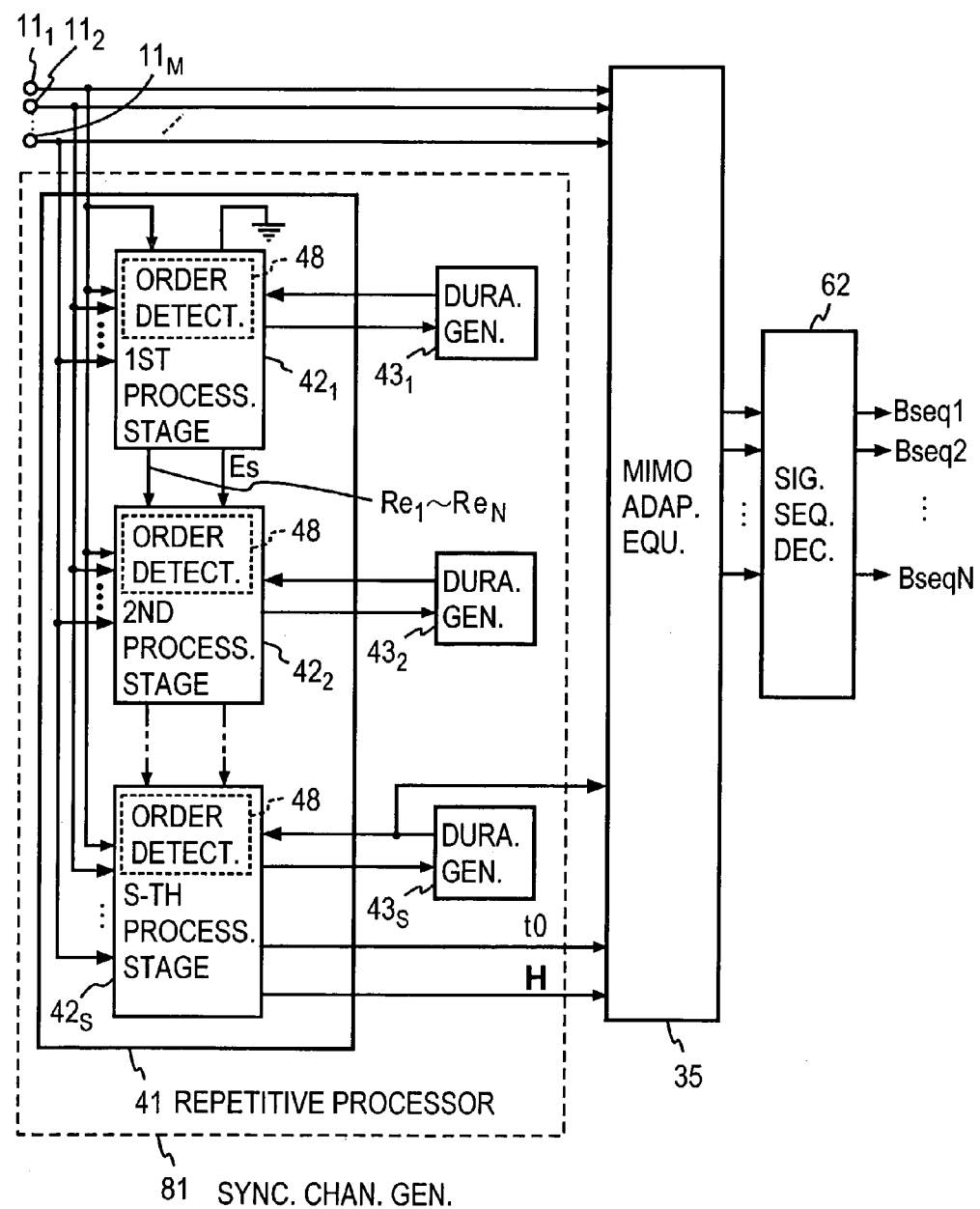
FIG. 19 is a diagram showing an exemplary functional arrangement of a receiver according to a fourth embodiment of the present invention.
Figure 20:
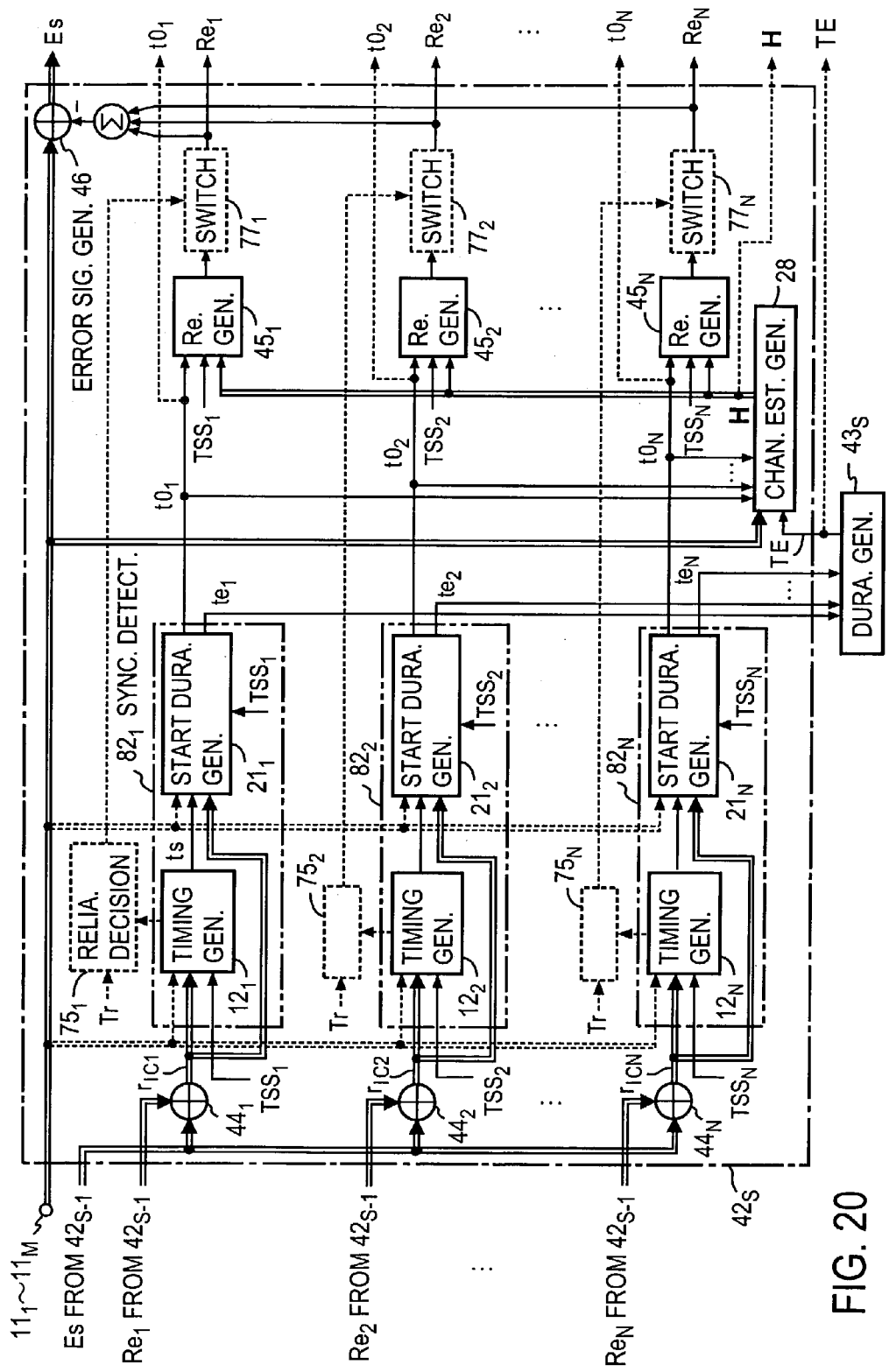
FIG. 20 is a diagram showing an exemplary functional arrangement of a processing stage 42$_s$ shown in FIG. 19.

Considering a common user received signal in the first embodiment, it will be seen that if the sync timing signal, the equalization start timing signal and the equalization duration candidate signal can be regarded as being substantially uniform between the antennas, these signals can be treated as common to the common user received signals between the antennas, and accordingly, the signals received by all the antennas can be processed by a single repetitive processor 41. Such concept represents a fourth embodiment of the present invention, and FIG. 19 shows an exemplary arrangement therefor. The distinction over the arrangement of the first embodiment resides in the fact that the received signals from all the antennas are collectively processed in the single repetitive processor 41 rather than the-repetitive processor 41 is provided for each received signal from the antenna. FIG. 20 shows an exemplary arrangement of an s-th processing stage $42_s$. The overall arrangement is similar to s-th processing stage $42_s$ shown in the first embodiment, but while only the received signal from one antenna $A_m$ is input in the first embodiment, received signals from antennas $A_1$ to $A_M$, or all the received signals from input terminals $11_1$ to $11_M$ are input in the fourth embodiment. The sync timing generators $12_1$ to $12_N$, and the start timing/duration candidate generators $21_1$ to $21_N$ which are here used may be constructed in the similar manner as shown in FIGS. 11 and 12, for example, when the action with respect to the received signal from the user 1 is considered. The replica generator may be constructed so that the processing in the first embodiment as shown in FIG. 15 may be repeated for each antenna so as to cover all the antennas. A collective processing of received signals from all the antenna is also applicable when the channel estimator 28 is provided for each user, in the similar manner as in the second embodiment shown in FIG. 16.

Fifth Embodiment

In the described embodiments, the first processing stage $42_1$ performs sync detection without canceling the replica. However, in this instance, the influence of a user signal having a strong reception power may cause a malfunctioning of the sync detection including the frame sync of the sync detector $82_n$ for user signals having a low reception power to induce a large deviation of the sync timing, with consequence that the accuracy of detecting the equalization start timing and the equalization duration for other user signals may be degraded.

In particular, when there is a large difference in the reception power between user (transmitter) signals, it is seen that the detection of the equalization start timing and the equalization duration and the channel estimation can be made with a better accuracy when based on user (transmitter) signals having a higher reception power, and thus it is expected that when the detection of the equalization start timing and the equalization duration and the channel estimation are made in a sequential order beginning with user signals having a higher reception power, the equalization start timing and the equalization duration can be obtained with a better accuracy. A fifth embodiment of the present invention is based on this concept.

Figure 21A:
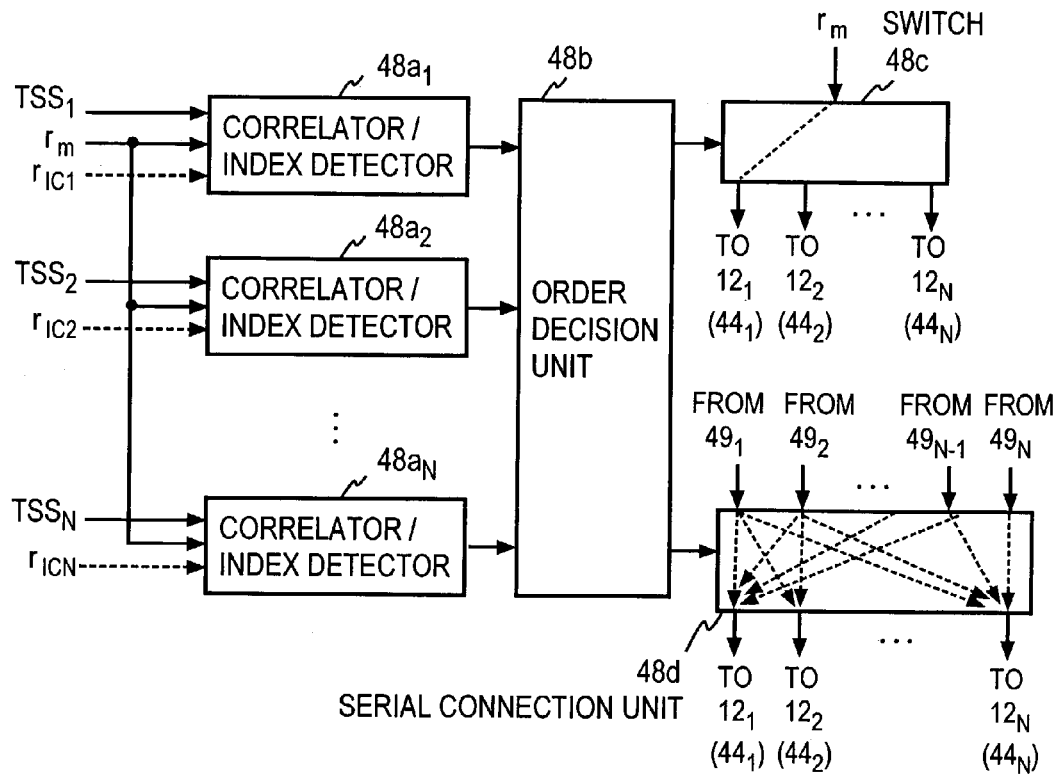
FIG. 21A is a diagram showing an exemplary functional arrangement of a processing order detector 48 in a fifth embodiment of the present invention.

The overall arrangement of the fifth embodiment is substantially similar to that shown in FIG. 18, but in each processing stage 42, the processing for each user takes place in series rather than in parallel configuration. In order to determine the sequential order of the series processing, a processing order detector 48 is provided at least in the first processing stage $42_1$, as shown in broken lines in FIG. 18, and before the sync detection, namely, the generation of the sync timing signal, the equalization start timing signal and the equalization duration signal and the channel estimation take place, a maximum value among the reception energy indices of the user signals is detected using the functional arrangement shown in FIG. 7, for example, to determine the sequential order of the user signals in the descending order of the maximum value of the reception energy index. As illustrated in FIG. 21A, for example, correlators/index detectors $48a_1, \ldots, 48a_n$, each comprising a correlator 14 as shown in FIG. 7 or FIG. 11, a energy index generator 37 and a section which detects a maximum value of the generated energy index, are provided to process user 1 training symbol sequence $TSS_1, \ldots$, user N training symbol sequence $TSS_N$ and the received signals to detect a maximum value of the energy index of each user received signal, and an sequential order of processing the user signals is determined in the descending order of the magnitude of the maximum value in an order decision unit 48b.

Figure 22:
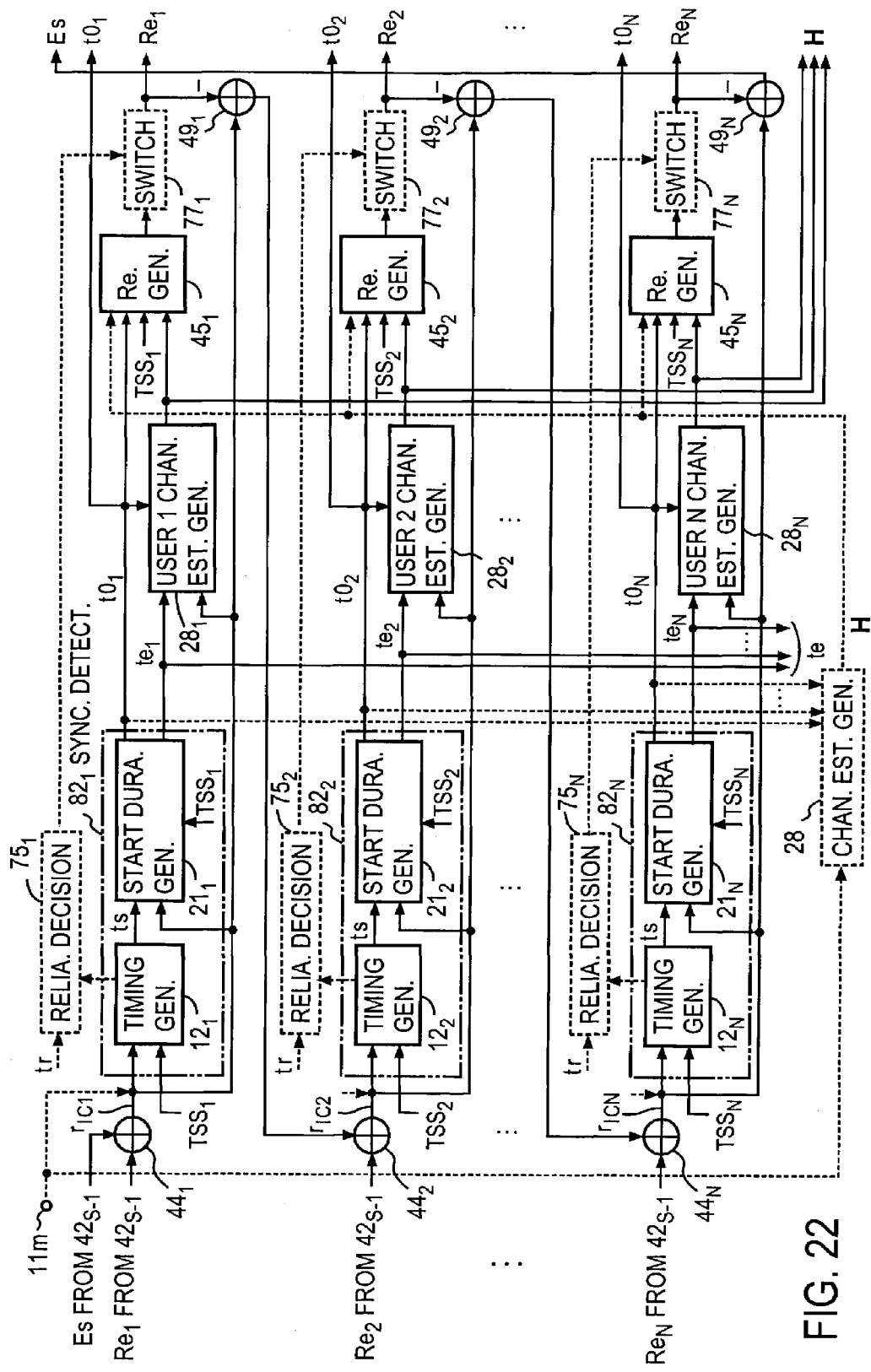
FIG. 22 is a diagram showing an exemplary functional arrangement of a processing stage 42$_s$ in the fifth embodiment.

Here it is assumed that the maximum values of the reception energy indices are in the descending order of user 1, user 2, . . . , user N. FIG. 22 shows an arrangement of a processing stage $42_s$. In the processing stage $42_s$, the generation of the sync timing signal, the equalization start timing signal $t0_1$ and the equalization duration signal $te_1$ or the sync detection and the estimation of the channel status H1 take place in the descending order of the maximum value of the reception energy index, or in the order beginning with the signal from the user 1. First of all, a received signal from which the received signal replica for all the users generated by (s−1)-th processing stage $42_{s-1}$ is subtracted, namely, an error signal $E_s$ is added with a received signal replica $Re_1$ for the user 1 which is generated in the preceding processing stage $42_{s-1}$ in an adder $44_1$. The added signal represents an interference suppression user 1 received signal which is equal to the received signal from which received signal replicas $Re_2$ to $Re_N$ for other than the user 1 are subtracted, and the interference suppression user 1 received signal $r_{IC1}$ is used in a sync timing generator $12_1$ to generate a sync timing signal. Then, the sync timing signal and the interference suppression user 1 received signal $r_{IC1}$ are input to a start timing/duration candidate generator $21_1$ to generate an equalization start timing signal and an equalization duration candidate signal. The sync timing generator $12_1$ and the start timing/duration candidate generator $21_1$ can be constructed in the similar manner as shown in FIGS. 7 and 8, respectively, as far as the signal from the user 1 is considered. The equalization start timing signal, the equalization duration candidate signal and the interference suppression user 1 received signal from the adder $44_1$ are input to the channel estimator $28_1$ to determine a channel status estimate $H_1$, and the channel status estimate $H_1$, the equalization start timing signal $t0_1$ and the training symbol sequence $TSS_1$ for the user 1 are used in a replica generator $45_1$ to generate a received signal replica $Re_1$ for the user 1. The received signal replica for the user 1 which is generated in the s-th processing stage $42_s$ is subtracted from interference suppression user 1 received signal from the adder 44, in a subtractor $49_1$, resulting in an error signal which is a result of subtracting the received signal replica for the user 1 which is generated in the s-th processing stage $42_s$ and the received signal replicas for other than the user 1 which is generated in the (s−1)-th processing stage $42_{s-1}$ from the received signal. A received signal replica from the (s−1)-th processing stage $42_{s-1}$ for the received signal having a maximum value of the reception energy index which is the second in magnitude, which is the user 2 received signal replica in this example, is added to the error signal in an adder $44_2$, thus generating an interference suppression user 2 received signal, which is fed to the sync timing generator $12_2$, the start timing/duration candidate generator $21_2$ and the channel estimator $28_2$ to repeat a similar processing, thus generating a replica of the user 2 received signal in a replica generator $45_2$. This replica is subtracted from the interference suppression user 2 received signal in a subtractor $49_2$ to generate an error signal, which is in turn fed to an adder $44_3$. A similar signal processing takes place for user 3 and subsequent users.

It is to be noted that in the first processing stage $42_1$, a processing of the received signal for the user 1 having a largest maximum value of the reception energy index takes place by directly supplying the received signal to the sync timing generator $12_1$, the start time/duration candidate generator $21_1$, the channel estimator $28_1$ and the subtractor $49_1$ in a manner indicated in broken lines to estimate the channel status for the user 1 signal and to generate a user 1 replica, and for the received signal for the user 2 having a second largest maximum value of the reception energy index, the received signal replica for the user 1 which is generated in the replica generator $45_1$ is subtracted from the received signal for the user 2 in a subtractor $49_1$ to feed the sync timing generator $12_2$, the start timing/duration candidate generator $21_2$, the channel estimator $28_2$ and the subtractor $49_2$. A subsequent processing takes place in the similar manner.

In the processing order detector 48 within the first processing stage $42_1$ (FIG. 18), a received signal from the terminal $11m$ is input to a switch $48c$, as shown in FIG. 21a and is delivered to one of the sync timing generators $12_1, \ldots, 12_N$ which is to undertake the signal processing of the user which is determined to be the first in the order of processings by the order decision unit $48b$, which is the sync timing generator $12_1$ undertaking the signal processing of the user 1 in this example. Outputs from the subtractors $49_1, \ldots, 49_N$ are input to a series connection unit $48d$, and are fed to the sync timing generators $12_1, \ldots, 12_N$ so that the user signals are sequentially processed in the order of processings which is determined by the order decision unit $48b$. In this example, outputs from the subtractors $49_1, \ldots, 49_{N-1}$ are fed to the sync timing generators $12_2, \ldots, 12_N$, respectively.

Figure 21B:
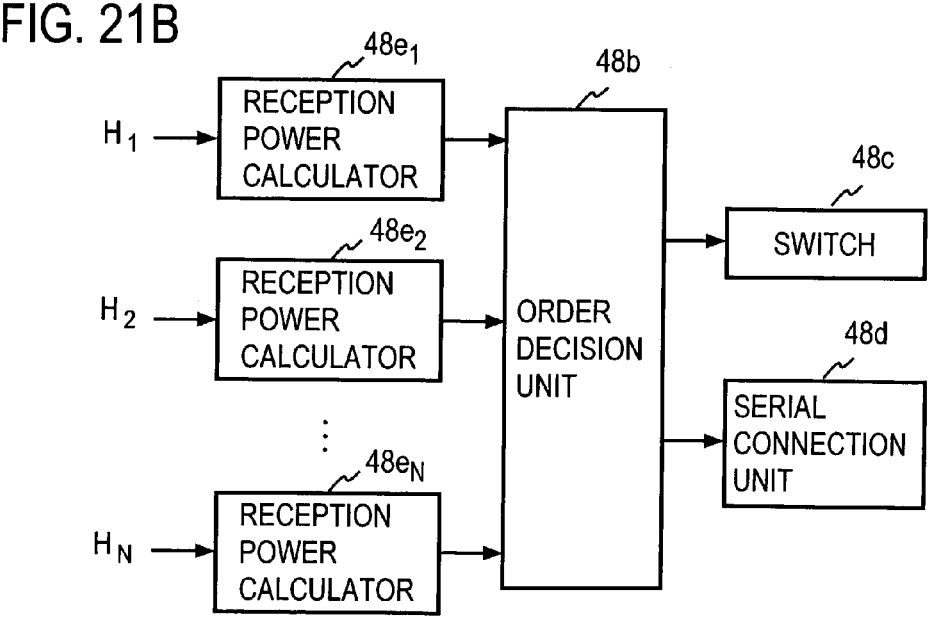
FIG. 21B is a diagram showing another example.

The second processing stage $42_2$ and subsequent processing stages may undertake the processings according to the order of processings which is determined in the first processing stage $42_1$. Alternatively, the processing order detector 48 may also be provided in the second processing stage $42_2$ and subsequent processing stages to determine the order of processings anew. In this instance, an output signal from an adder $44_n$, rather than the received signal, is input to each correlator/index detector $48a_n$ (n=1, . . ., N). In the processing order detector 48 which is provided in the second processing stage $42_2$ and subsequent processing stages, each user n channel status estimate $H_n$ which is generated in a processing stage $42_{s-1}$ may be fed to a reception power calculator $48e_n$, as shown in FIG. 21B, and a sum of squared coefficients of the channel status estimates (impulse responses) may be obtained to determine the reception power, and the order decision unit $48b$ may determine the order of processings for the user signals in the descending order of the magnitude of the reception power. Alternatively, in FIG. 21A, the correlators/index detectors $48a_1, \ldots, 48a_N$ may detect correlation outputs, namely, the maximum value of each output from the correlators $14_1, \ldots, 14_N$ shown in FIG. 7, rather than the maximum value of the energy index to feed the order decision unit $48b$.

In this manner, performing the processings of the user signals in a serial manner is also applicable to the collective processing of all the antenna received signals shown in FIGS. 19 and 20. In such instance, the channel estimator 28 shown in FIG. 20 is provided for each user, and at least the first processing stage $42_1$, shown in FIG. 19 is provided with a processing order detector 48, as indicated by broken lines.

Sixth Embodiment

The fifth embodiment illustrates a serial arrangement of the repetitive processor means $41_m$ which is intended to subtract the received signal replica of the training symbol sequence which is sequentially generated from the received signal in a sequential manner as an approach which allows an improvement in the accuracy of detecting the sync timing, the equalization start timing and the equalization duration and the accuracy of estimating channel status to be realized when there is a large difference in the reception power between the users. When this approach is employed, it follows that an interference suppression received signal (or a received signal from which the replica is subtracted) which is detected in the first processing stage $42_1$ or at an early stage is processed while received signal replicas for other users which are generated at a later stage are not subtracted, gives rise to a problem that an error is likely to occur in the sync timing, the equalization start timing and the equalization duration. In particular, when a difference between the reception powers having the first and the second largest magnitude is small, if a relatively large error occurs in the equalization start timing and the equalization duration which are detected from the first user signal, the received signal replica for this user will be greatly different from the user received signal itself, and this has a great influence upon the processings of other user received signals.

Figure 23:
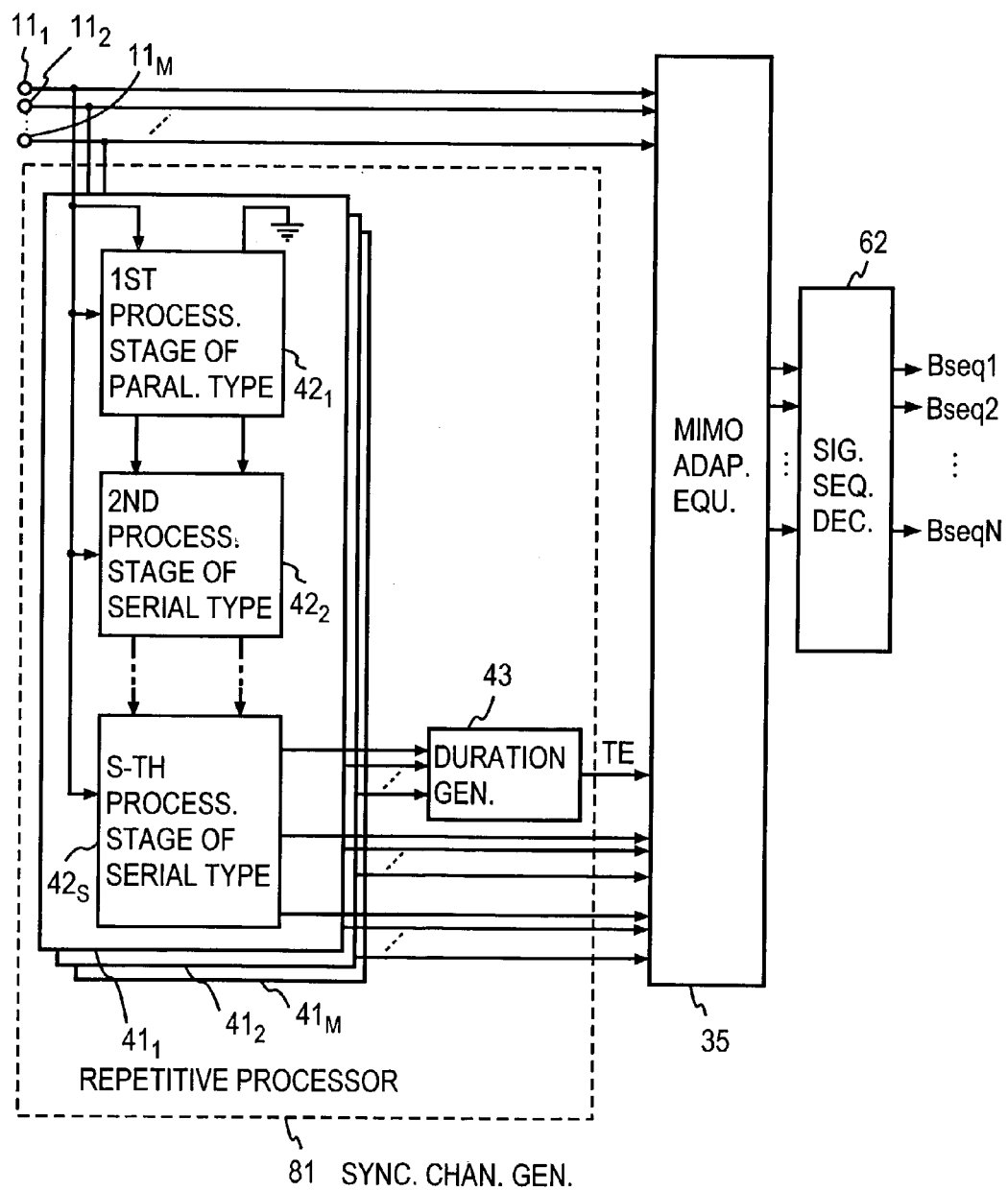
FIG. 23 is a diagram showing an exemplary functional arrangement of a receiver according to a sixth embodiment of the present invention.

To solve this problem, in the sixth embodiment of the present invention, this influence is alleviated by using a sync detector and a channel estimator in parallel configuration only in the first processing stage $42_1$ while a sync detector and a channel estimator of a serial type are used in the second processing stage $42_2$ and subsequent processing stages as indicated in FIG. 23. The processing means of parallel configuration may be constructed as shown in FIG. 19 while the processing stages of serial type may be constructed as shown in FIG. 21. A collective processing of all the antenna received signals as in the fourth embodiment shown in FIGS. 19 and 20 is also possible in the sixth embodiment.

Seventh Embodiment

In the fifth and the sixth embodiment, the repetitive processor means $41_m$ of a serial type is employed to subtract a received signal replica of a training symbol sequence from a received signal with an intention that the accuracy of detecting the equalization start timing and the equalization duration and the accuracy of estimating the channel status could be improved when there is a large difference in the reception power between the users. However, when this approach is employed, a processing of each user cannot take place in parallel manner, giving rise to a problem that a delay of the processing may increase.

Figure 24:
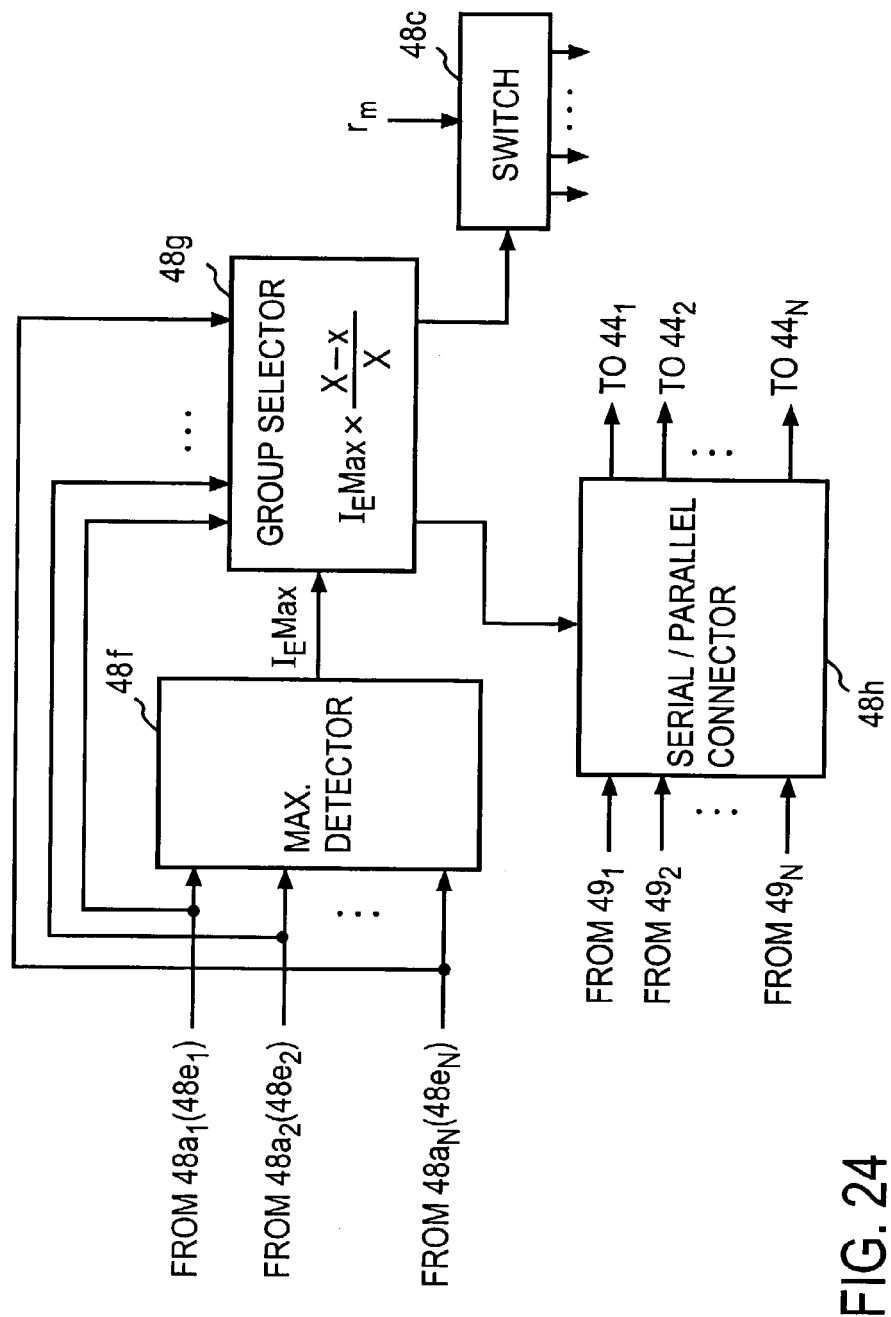
FIG. 24 is a diagram showing an exemplary functional arrangement of a processing order detector 48 in the sixth embodiment.
Figure 25:
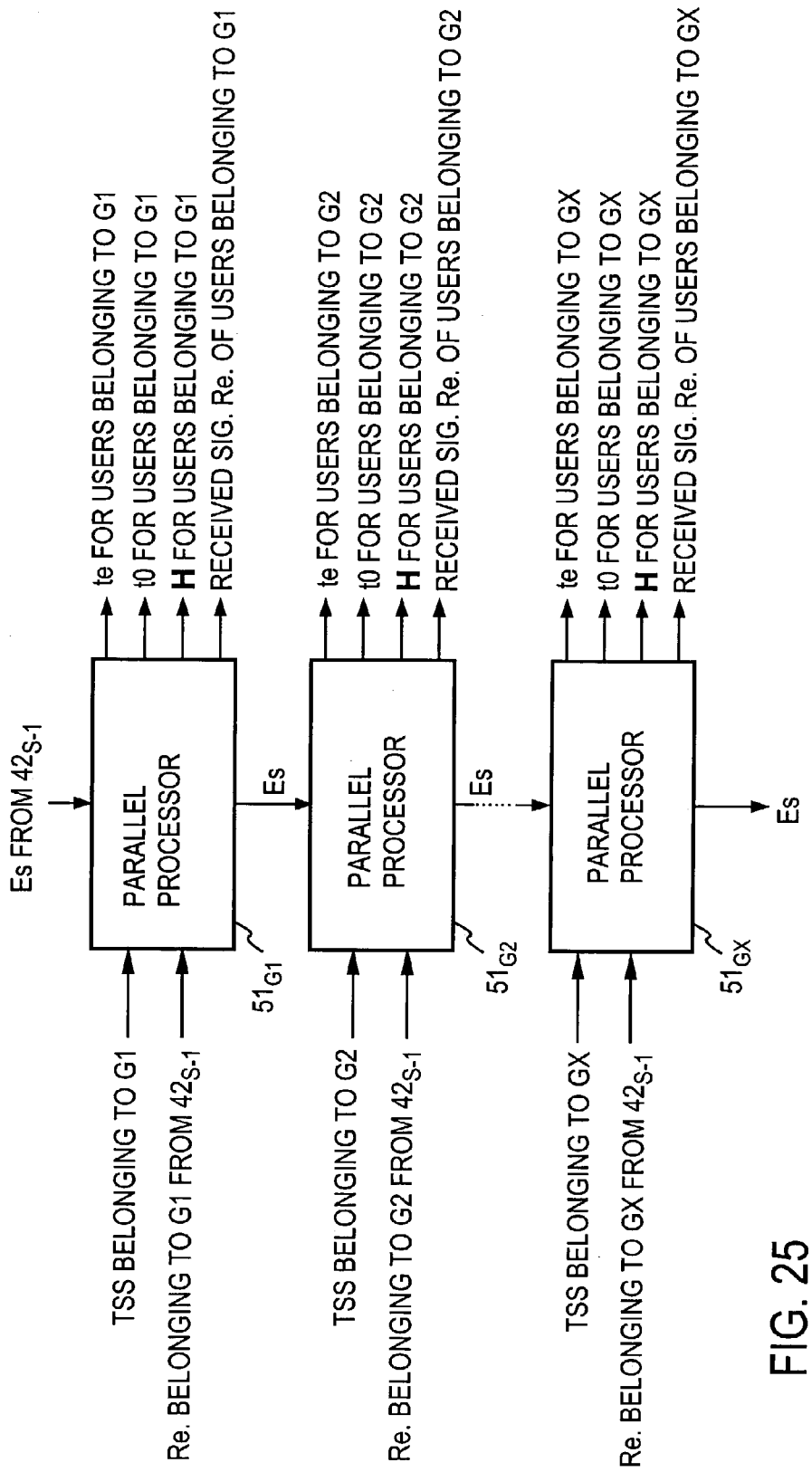
FIG. 25 is a diagram showing an exemplary functional arrangement of a processing stage 42$_s$ in a seventh embodiment of the present invention.

To solve this problem, a seventh embodiment of the present invention is constructed as a composite structure affording both the advantage of the parallel type and the advantage of the serial type. The overall arrangement of the seventh embodiment may be similar to that shown in FIG. 18. Before generating the equalization start timing signal and the equalization duration signal and performing a channel estimation, the processing order detector 48 is arranged such that by utilizing the energy index generator 37 as shown in FIG. 7, for example, a maximum value of the reception energy index for each user is detected, the users are divided into several groups each including $N_{G1}$, $N_{G2}$, $N_{G3}$, ..., $N_{GX}$ users (where G1, G2, G3, ..., GX represent natural numbers) in the descending order of the maximum of the reception energy index. These groups are designated as G1, G2, G3, ..., GX. This grouping takes place as shown in FIG. 24, for example. Specifically, a maximum value detector 48f detects a maximum value $I_E$Max among maximum values $I_{Emax1}$ to $I_{EmaxN}$ of the reception energy index of a user n from the correlators/index detectors $48a_1$ to $48a_N$ shown in FIG. 21A, and a group selector 48g determines such that denoting the number of groups by X, users having a maximum value $I_{Emaxn}$ equal to or greater than $I_E$Max×(X−1)/X are bundled into a group G1, users having $I_{Emaxn}$ equal to or greater than $I_E$Max×(X−2)/X and excluding the initial users be bundled into a group G2 and so on. The processing stages $42_1$ to $42_s$ perform a parallel processing of each group, but the parallel processing proceeds in the sequence of group G1 to G2, G3, ..., GX. FIG. 25 shows an arrangement of repetitive processor means $41_m$ of such composite type, namely, including both parallel type and serial type. In an s-th processing stage $42_s$, an error signal from an (s−1)-th processing stage $42_{s-1}$ and a user received signal replica which belongs to the group G1 are input to a parallel processor $51_{G1}$, and in the parallel processor $51_{G1}$ for the group G1, each user received signal replica of the group G1 is added to the error signal to form interference suppression signals which are equal to $N_{G1}$ in number, and the sync timing signal, the equalization start timing signal, the equalization duration candidate signal and the channel status estimate for these or for the user received signals which belong to the group G1 are generated. In this manner, the processing of $N_{G1}$ user signals which belong to the group G1 takes place in a parallel fashion. These $N_{G1}$ received signal replicas are subtracted from the signal formed by adding the generated $N_{G1}$ received signal replicas generated at the previous stage and interference suppressed received signal to provide a signal (an error signal), which is fed to the parallel processor $51_{G2}$ for the next group G2. User received signal replicas which belong to the group G2 and which are fed from the (s−1)-th processing stage $42_{s-1}$ are input to the parallel processor $51_{G2}$, which processes these user received signal replicas and the error signal from the parallel processor $51_{G1}$ in the similar manner as is performed in the parallel processor $51_{G1}$, thus performing the detection of the sync timing signal, the equalization start timing signal and the equalization duration candidate signal and the generation of the received signal replicas for the users which belong to the group G2 in parallel fashion. Then the received signal replicas generated which belong to G2 are subtracted from the signal which is formed by adding $N_{G2}$ interference suppression received signals which are generated by the parallel processor $51_{G2}$ to provide an error signal, which is in turn delivered to a parallel processor $51_{G3}$ for the next following group G3. A similar processing is subsequently continued.

Each of the parallel processors $51_{G1}$ to $51_{GX}$ may be constructed in the similar manner as in the first to third embodiment which are respectively shown in FIG. 14, FIG. 16 and FIG. 18. In the present example, the first processing stage $52_1$ is constructed as shown in FIG. 14, and in the parallel processor $51_{G1}$ for the initial group G1, there is no input of an error signal and received signal replicas belonging to the group G1 which are fed from the previous stage, but the received signals are input and processed. The user received signal replicas generated which belong to G1 are subtracted from the received signals to be fed to the parallel processor $51_{G2}$ as the received signal to be processed. A similar processing sequentially takes place in subsequent parallel processors $51_{G2}$ to $51_{GX}$.

The received signal which is input to a switch 48c is directed to one of the sync timing generators $12_1$, ..., $12_N$ which is determined by the processing order detector 48 shown in FIG. 24 as corresponding to each user of the group G1. Of outputs from the subtractors $49_1$, ..., $49_N$ which are input to a serial-parallel connection unit 48h, those outputs which correspond to the users in the group G1 are directed to one of the sync timing generators $12_1$, ..., $12_N$ which is determined by the processing order detector 48 as corresponding to each user belonging to the next group G2. Outputs from a subtractor 49 which correspond to the users in the group G2 are fed to the sync timing generators 12 which correspond to the users in the next following group G3, respectively. In a similar manner, the processing of each group takes place in a sequential manner. In the second processing stage $42_2$ and subsequent processing stages, where a composite processing is desired, outputs from the adders $44_1$, ..., $44_N$ rather than the received signals, may be fed to the correlators/index detectors $48a_1$, ..., $48a_N$. Alternatively, the correlators/index detectors may be replaced by the reception power calculators $48e_1$, ..., $48e_N$ shown in FIG. 21B. As a further alternative, in the correlators/index detectors $48a_1, \ldots, 48a_N$ shown in FIG. 24, the maximum value of the energy index may be replaced by the correlation outputs. Specifically, the maximum values of outputs from the correlators $14_1, \ldots, 14_N$ shown in FIG. 7 may be fed to the maximum value detector $48f$ and the group selector $48_g$.

In the fifth to the seventh embodiment, the received signals from the antennas $A_1$ to $A_M$ are processed by the repetitive processor means $41_1$ to $41_M$, but in the similar manner as mentioned above in connection with the fourth embodiment, when the received signals from all the antennas are collectively processed by a single repetitive processor 41, it may be constructed as a serial type or as a composite structure of serial type and parallel type.

Figure 26:
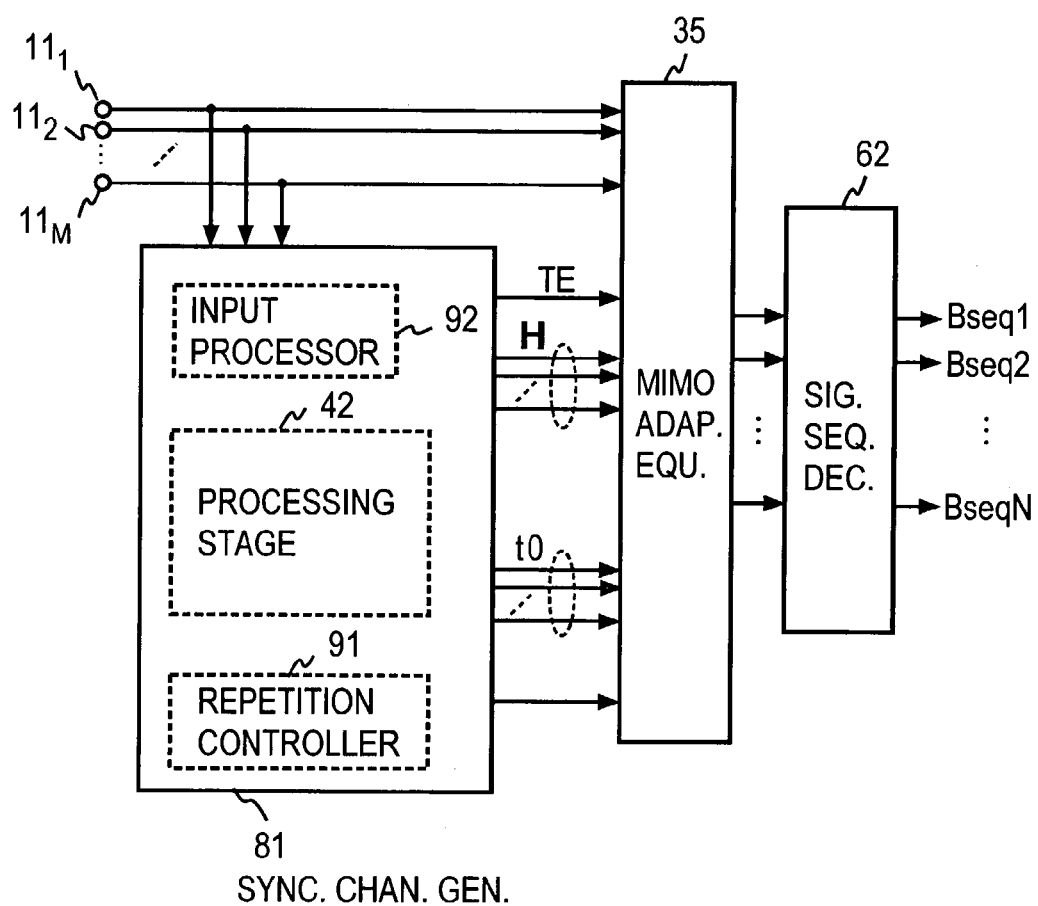
FIG. 26 is a diagram showing an exemplary arrangement in which the processor is repeatedly used to serve as individual processing stages.

In addition, the first to the S-th processing stage $42_1$ to $42_s$ need not be provided as a hardware arrangement. For example, one of the processing means 42 as shown in FIGS. 14, 16, 20, 22 and 25 may be provided in a sync/channel generator 81 as shown in FIG. 26, and may be repetitively used. Except for the arrangement shown in FIG. 20, one processing stage 42 can be provided for each repetitive processor $41_m$. A repetition controller 91 controls an input switch 92 to feed an antenna received signal to sync detectors $82_1$ to $82_N$ in the processing means 42 (which is only the sync detector $82_1$ in FIG. 24 and is only the parallel processor $51_{G1}$ in FIG. 25) to process the received signal initially, thus causing it to operate as the first processing stage $42_1$. A result of the processing or received signal replicas $Re_1$ to $Re_N$ are fed to adders $44_1$ to $44_N$, respectively. It then changes the input switch 92 to feed an error signal Es to the adders $44_1$ to $44_N$ (which is only the adder $44_1$ in FIG. 22 and is only the parallel processor $51_{G1}$ in FIG. 25), thus causing it to operate as the second processing stage $42_2$. In a similar manner, the single processing stages 42 is repeatedly used and during the S-th run, the processing stage 42 is caused to operate as the S-th processing stage $42_s$, and the equalization start timing signal, the equalization duration signal and the channel status estimate which are obtained as a result of the processing is delivered to the MIMO adaptive equalizer 35. In each embodiment described above, the channel estimate which is obtained in the preceding processing stage $42_{s-1}$ may be input to a corresponding channel estimator in the processing stage $42_s$. This enables a rapid convergence of the channel status.

In the embodiments described above, when the detected timing has a poor reliability, it is desirable that a replica which is generated using the timing is not delivered. In such instance, as indicated by broken lines in FIG. 14, the energy index of the received training symbol sequence signal for the user n from the sync timing generator $12_n$ (n1, . . . , N)(or the output from the energy index generator $37_n$ shown in FIG. 7) or its correlation signal with the training symbol sequence for the user n (or the output from the correlator $14_n$ shown in FIG. 7) is compared against a threshold value Tr from a threshold value storage $76_n$ in a reliability decision unit $75_n$, and if it is equal to or less than the threshold value Tr, a decision is rendered that it lacks reliability, whereupon an output from the reliability decision unit $75_n$ is used to turn the switch $77_n$ off, thus preventing the replica from the replica generator $45_n$ from being delivered. When the timing detected by the sync timing generator $12_n$ is decided to be of a poor reliability, the detection of the equalization start timing and the equalization duration and the channel estimation are made with respect to the signal from the user n, but no replica is generated, thus preventing the replica from being delivered.

A decision concerning whether or not the reliability of the detected timing is low is made as indicated by broken lines in FIG. 16. Specifically, a square sum of coefficients of the channel status (impulse response) $H_n$ which is estimated by the channel estimator $28_n$ in the preceding processor $42_{s-1}$ is calculated by a reception power calculator $78_n$, and when the reception power is equal to or less than the threshold value Tr, the switch $77_n$ may be turned off by an input from the reliability decision unit $75_n$. In any event, a fixed value may be used for the threshold value Tr. Alternatively, the threshold value Tr may be the square sum of coefficients of the impulse response representing the previous channel status estimate multiplied by a constant X (0<X<1; because there is a relatively high reliability, a value which equal to or greater than 0.5), or the maximum value of the energy index or correlation output for the entire symbol sequence may be multiplied by a constant X (0<X<1; in this instance, it is preferred to chose a value equal to or less than 0.5 is desired). Avoiding the delivery of the replica when the timing has a poor reliability is also applicable to other embodiments, and its functional arrangement is shown in broken lines in applicable drawings without specifically describing it.

Eighth Embodiment

Figure 27:
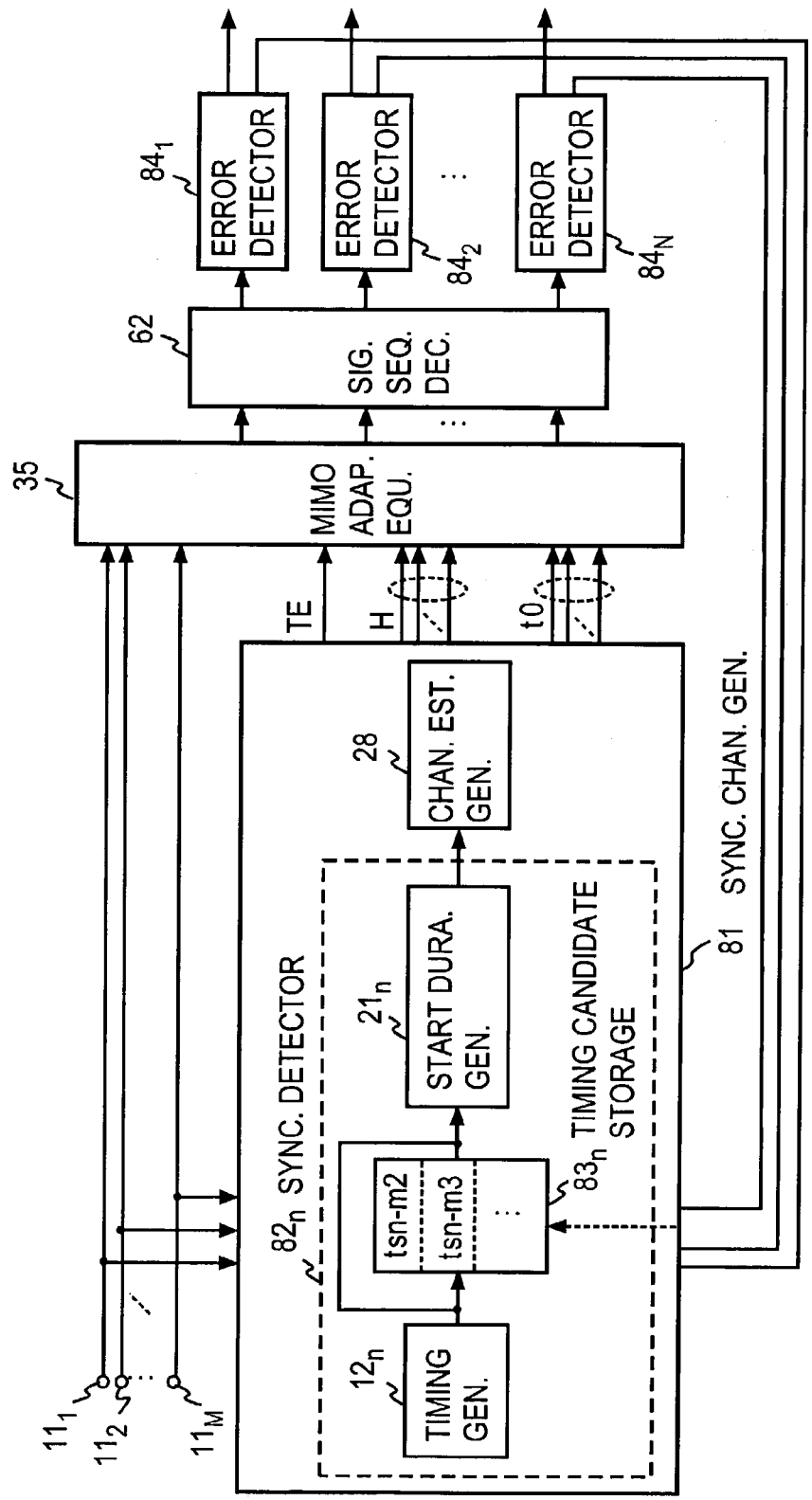
FIG. 27 is a diagram showing essential parts of a functional arrangement of an eighth embodiment of the present invention.

In an eighth embodiment of the present invention, when an error is detected in a decoded decided bit train, this detection is fed back to the sync detector in the sync/channel generator, and a next first candidate in predetermined sync timings is used instead. A functional arrangement of the eighth embodiment is shown in FIG. 27. In a sync/channel generator 81, which may be a sync timing generator $12_n$ in the last processing stage $42_s$ of a sync detector $82_n$ (n=1,2, . . . , N) shown in one of FIGS. 13, 18 and 19, for example, the timings when the energy index (which corresponds to an output from the energy index generator $37_n$ shown in FIG. 7) or the correlation output (which corresponds to an output from the correllator $14_n$ shown in FIG. 7) is a local maximum may be detected as tsn-m1, tsn-m2, tsn-m3 . . . in the descending order of the magnitude, and the second and subsequent timings are stored as a second candidate, a third candidate . . . in a timing candidate storage $83_n$. Initially, the maximum value tsn-m1 is used to generate the equalization start timing signal, the equalization duration signal and the channel status estimate, which are used in the adaptive equalization processing applied to the received signal in the MIMO adaptive equalizer 35, and the signal sequence decoder 46 performs a repeated decoding operation. During the first run, a decided bit sequence for the users 1 to N is generated, and is then subject to an error detection by error detectors $84_1, \ldots, 84_N$. If an error is detected in the decoded bit sequence for the user n, for example, during the error detection, the result output is fed back to the sync detector $82_n$ for the user n signal in the sync/channel generator 81, and a next timing candidate, which is tsn-m2 in this instance, is taken from the candidate storage $83_n$ and is used to generate the equalization start timing signal, the equalization duration signal and the channel status estimate. Using these signals and value, the adaptive equalization upon the received signal is applied to the user n signal in a signal sequence n equalizer $69_n$ (see FIG. 3), and the equalized output is used in the signal sequence n decoder $62_n$ (see FIG. 2) in the signal sequence decoder 62 to perform a decoding operation, thus determining a decided bit sequence for the user n. This decided bit sequence is again subject to the error detection, and if an error is detected again, the following timing candidate tsn-m3 is used to repeat a similar processing. The cyclic redundancy check (CRC) method can be used in the error detection. In FIG. 27, the processing stage 42 of the repetitive processor 41 within the sync/channel generator 81 is assumed to be constructed as shown in FIG. 13, but may be constructed as shown in FIG. 16, 20, 22 or 25.

Ninth Embodiment

Figure 28:
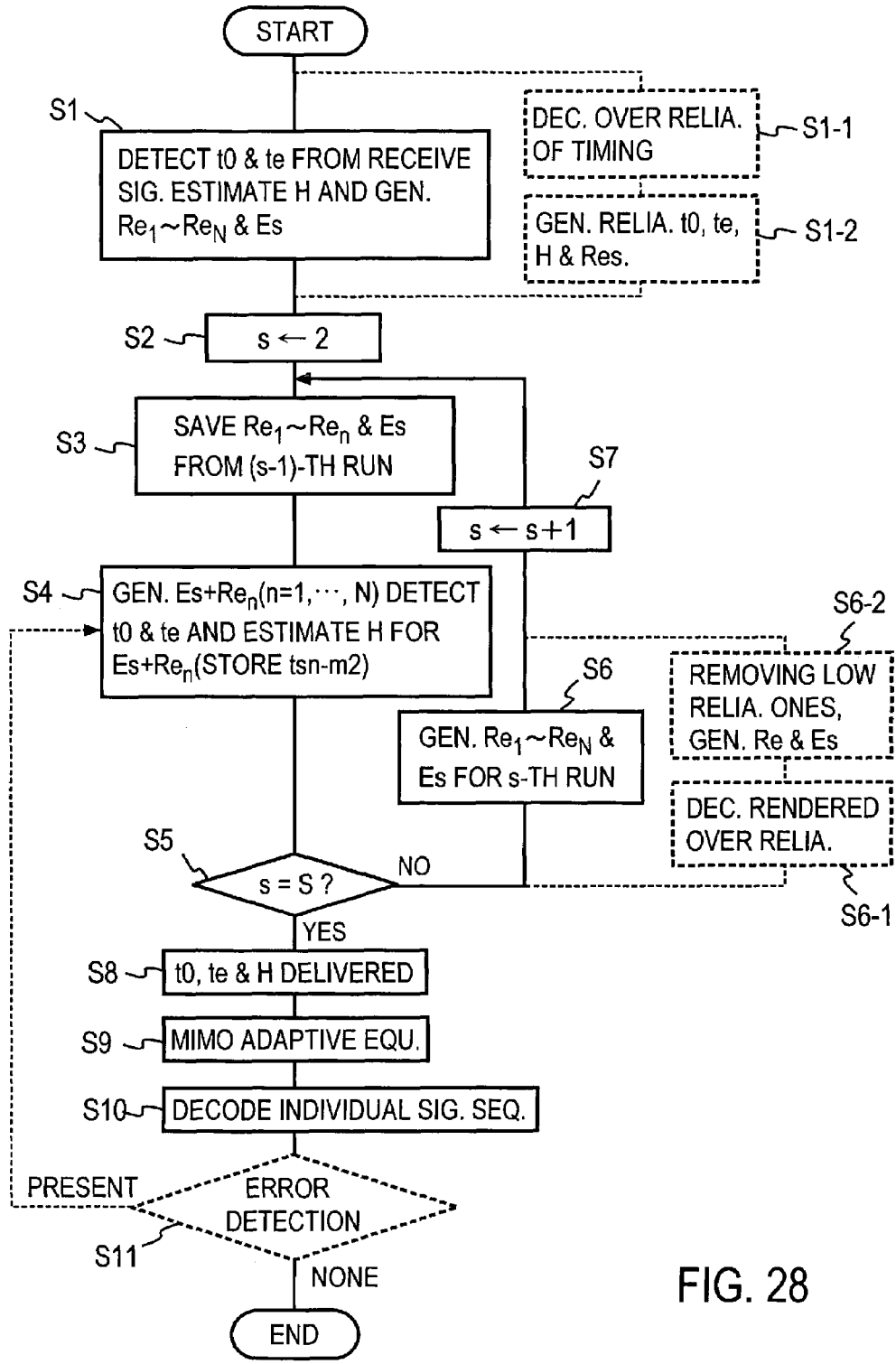
FIG. 28 is a flow chart of an exemplary processing procedure in the method of the present invention which corresponds to the first to the fourth embodiment.

A method according to the present invention will now be described. FIG. 28 shows a processing procedure according to an ninth embodiment of the method which corresponds to the first to the fourth embodiment. At step S1, the detection of the equalization start timing t0, the detection of the equalization duration candidate te, the estimation of the channel status H and the generation of the received signal replica $Re_n$ (n=1,2, ..., N) are performed in parallel fashion for the received signal using a training symbol sequence which corresponds to the signal from each transmitter. The received signal replica is subtracted from the received signal to generate an error signal Es.

At step S2, a run parameter s is initialized to 2. At step S3, received signal replicas $Re_1$ to $Re_N$ which are generated during the (s−1)-th run and the error signal Es are saved, and at step S4, the replicas $Re_1$ to $Re_N$ are each added to the error signal Es saved to generate an interference suppression received signal $r_{IC1}$ to $r_{ICN}$, and using a training symbol sequence which corresponds to such interference suppression received signal, the detection of the equalization start timing t0, the detection of the equalization duration candidate de and the estimation of the channel status H take place.

At step S5, an examination is made to see if s is equal to S, and if not, at step S6, using t0, te and H which are generated at step S4 and respective training symbol sequences, received signal replicas $Re_1$ to $Re_N$ are generated, and using these, an error signal Es is generated. Subsequently, at step S7, s is incremented by one before returning to step S3. If it is found at step S5 that s is equal to S, at step S8, t0, te and H which then prevail are delivered to the MIMO adaptive equalizer 35. At step S9, t0, te and H are used to apply an adaptive equalization of the received signal and at step S10, each signal sequence (transmitter signal) which has been subject to the equalization processing is subject to a decoding processing.

When the error detection of the eighth embodiment is performed, a plurality of timing candidates tsn-m2, tsn-m3 and so on which are detected at step S4 are stored and are used if an error is detected in the error detection of each decoded signal sequence at step S11, as indicated by broken lines. If an error is detected, the operation returns to step S4, and the stored timing candidate tsn-m2 is used to detect the equalization start timing t0 and the equalization duration te. When it is desired not to use the replica which corresponds to the detected timing of a poor reliability, the detection of t0 and te for each transmitter signal is made at step S1-1 to estimate H or renders a decision upon the reliability of the detected timing, as indicated by broken lines in FIG. 28. In the described embodiment, a decision of low reliability is rendered if the energy index of the received signal (or the interference suppression signal) which corresponds to the transmitter signal or a correlation output with the training symbol sequence or a square sum of coefficients of the channel status which is estimated during the previous run is below a given value. At step S1-2, replicas $Re_1$ to $Re_N$ except for those for which the reliability of the detected timing is decided to be low are generated, and are subtracted from the received signal to provide an error signal Es before transferring to step S2. Instead of step S6, the reliability of the detected timing may be decided at step S6-1, and only replicas which are free from the likelihood of a low reliability may be generated at step S6-2 and subtracted from the received signal to provide Es before transferring to step S7.

At steps S1 and S4, when the operation takes place according to the first and the fourth embodiment, the estimation of the channel status H takes place collectively, and when the operation takes place according to the second and the third embodiment, the estimation takes place for each transmitter training symbol sequence. A compensation for the timing offset during the adaptive equalization is referenced to the earliest one of the equalization start timings, and the equalization duration TE which is used in the adaptive equalization is chosen as the longest one of the equalization duration candidates te, as mentioned previously.

Tenth Embodiment

Figure 29:
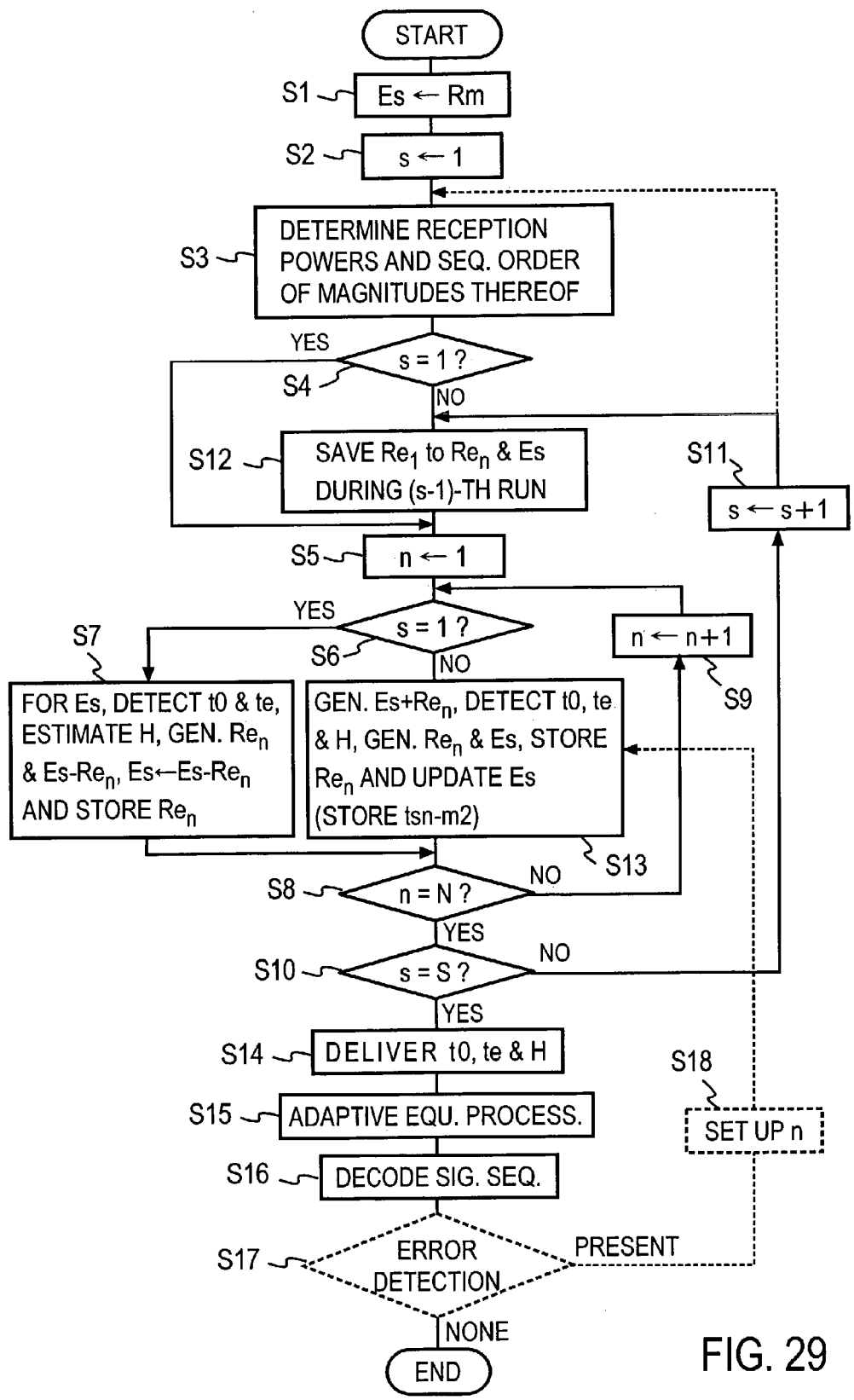
FIG. 29 is a flow chart of an exemplary processing procedure in the method of the present invention which corresponds to the fifth embodiment.

Referring to FIG. 29, a tenth embodiment of the method which corresponds to the fifth embodiment will be described. At step S1, an error signal Es acting as a processed signal parameter is initialized to a received signal $R_m$, and at step S2, the run parameter s is initialized to 1. At step S3, the reception power per symbol is determined for transmitted signals from N transmitters and ordinal numbers are applied to the transmitter training symbol sequences in the descending order of the magnitude thereof. It is assumed here that the ordinal sequence is in the order of n=1, 2, ..., N. At step S4, an examination is made to see if s is equal to 1, and if it is equal to 1, the parameter n representing the order of magnitude of the reception power is initialized to 1 at step S5. At step S6, an examination is made to see if s is equal to 1 and if it is, t0 and te are detected and H is estimated for the error signal Es using the training symbol sequence $TSS_n$, and they are used with the training symbol sequence $TSS_n$ to generate a replica $Re_n$. $Re_n$ is subtracted from Es to update Es while storing $Re_n$. At step S8, an examination is made to see if n is equal to N, and if not, n is incremented by one at step S9 before returning to step S6. If it is found at step S8 that n is equal to N, an examination is made at step S10 to see if s is equal to S, and if not, s is incremented by one at step S11 before transferring to step S12. If n=N at step S8, it follows that the error signal Es is an error signal obtained by subtracting all the replicas $Re_1$ to $Re_N$ from the received signal. If s is not equal to 1 at step S4, the operation transfers to step S12. At step S12, the received signal replicas $Re_1$ to $Re_N$ which are generated during the (s−1)-th run and the error signal Es are saved before transferring to step S5. If s is not equal to 1 at step S6, at step S13, $Re_n$ is added to the Es which is saved at step S12 to generate an interference suppression received signal $r_{ICn}$, for which t0 and te are detected using the training symbol sequence $TSS_n$ to estimate H, and they are used together with the training symbol sequence $TSS_n$ to generate and store the received signal replica $Re_n$, which is then subtracted from the interference suppression received signal to generate an error signal Es to update Es before transferring to step S8.

If s is equal to S at step S10, t0, te and H which then prevail are delivered to the MIMO adaptive equalizer 35. It is to be noted that during the s=S-th run, no received signal replica $Re_n$ is generated at step S13, and no Es is generated if n=N. At step S15, the MIMO adaptive equalizer 35 applies an adaptive equalization to the received signal, and the separated symbol sequence is decoded by the signal sequence decoder 62 at step S16.

When the operation is to take place according to the eighth embodiment, the timing candidates tsn-m2, tsn-m3 and so on are stored at step S13, and when an error is detected during the error detection at step S17, an ordinal number n is set up for the transmitter signal before transferring to step S13. If the sequential order of the transmitter signals which are processed is changed during each processing run, the operation returns to step S3 after the step S11, as indicated by broken lines in FIG. 29. The determination of the reception power which takes place at step S3 during s=2 and subsequent runs is performed upon the error signal Es and the replicas $Re_1$ to $Re_N$ which are obtained during the previous run.

Eleventh Embodiment

Figure 30:
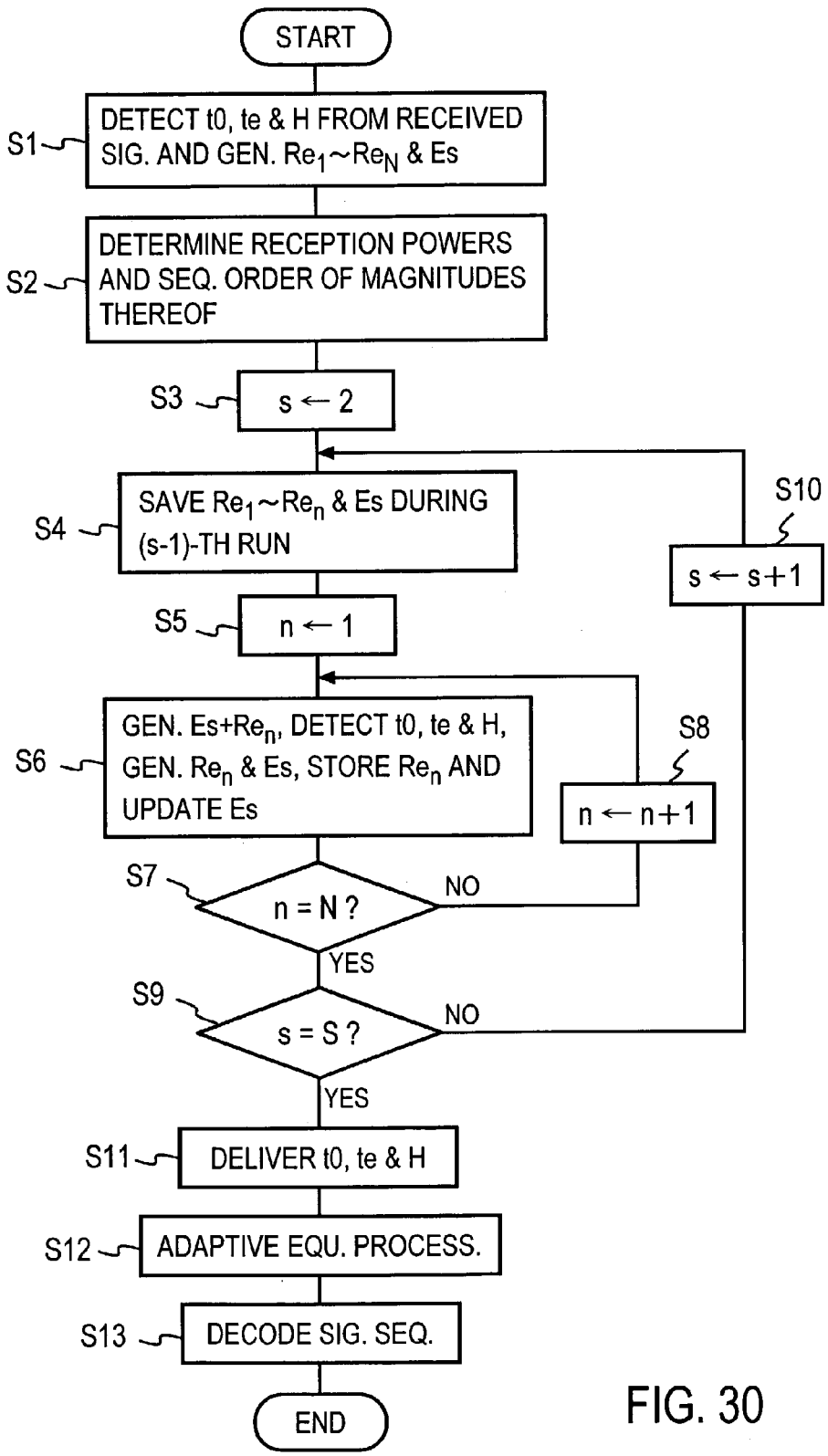
FIG. 30 is a flow chart of an exemplary processing procedure in the method of the present invention which corresponds to the sixth embodiment.

Referring to FIG. 30, an eleventh embodiment for the method which corresponds to the sixth embodiment will now be described. At step S1, t0 and te are detected from the recieved signal, H is estimated and $Re_1$ to $Re_N$ and Es are generated.

At step S2, the reception power per symbol is determined for each of N transmitter signals, and ordinal numbers are applied to the transmitter training symbol sequences in the descending order of the magnitude. It is assumed here that the sequential order is in the sequence of n=1, 2, ..., N. At step S3, s is initialized to 2, at step S4, the received signal replicas $Re_1$ to $Re_N$ which are obtained during the (s-1)-th run and the error signal Es are saved, at step S5, s is initialized to 1, and at step S6, $Re_n$ is added to the saved Es to generate an interference suppression received signal, for which t0 and te are detected and H is estimated, and using these, a received signal replica $Re_n$ is generated and stored, and this $Re_n$ is subtracted from the interference suppression received signal $r_{IC_n}$ to generate an error signal Es, thus updating Es.

An examination is made at step S7 to see if n is equal to N, and if not, n is incremented by one at step S8 before returning to step S6. If n=N at step S7, an examination is made at step S9 to see if s is equal to S and if not, s is incremented by one at step S10 before returning to step S4. If s is equal to S at step S9, t0, te and H which then prevail are delivered to the MIMO adaptive equalizer 35 at step S11. It is to be noted that during s=S-th run, no received signal replica $Re_n$ is generated at step S6, and no Es is generated if n=N. At step S12, the MIMO adaptive equalization is applied to the received signal, and at step S13, the symbol sequence which has been processed by the equalization is decoded into a signal sequence. While not shown, in this instance, the error detection may also be applied, and if there is an error, the timing candidates are used to determine te and H.

Twelfth Embodiment

Figure 31:
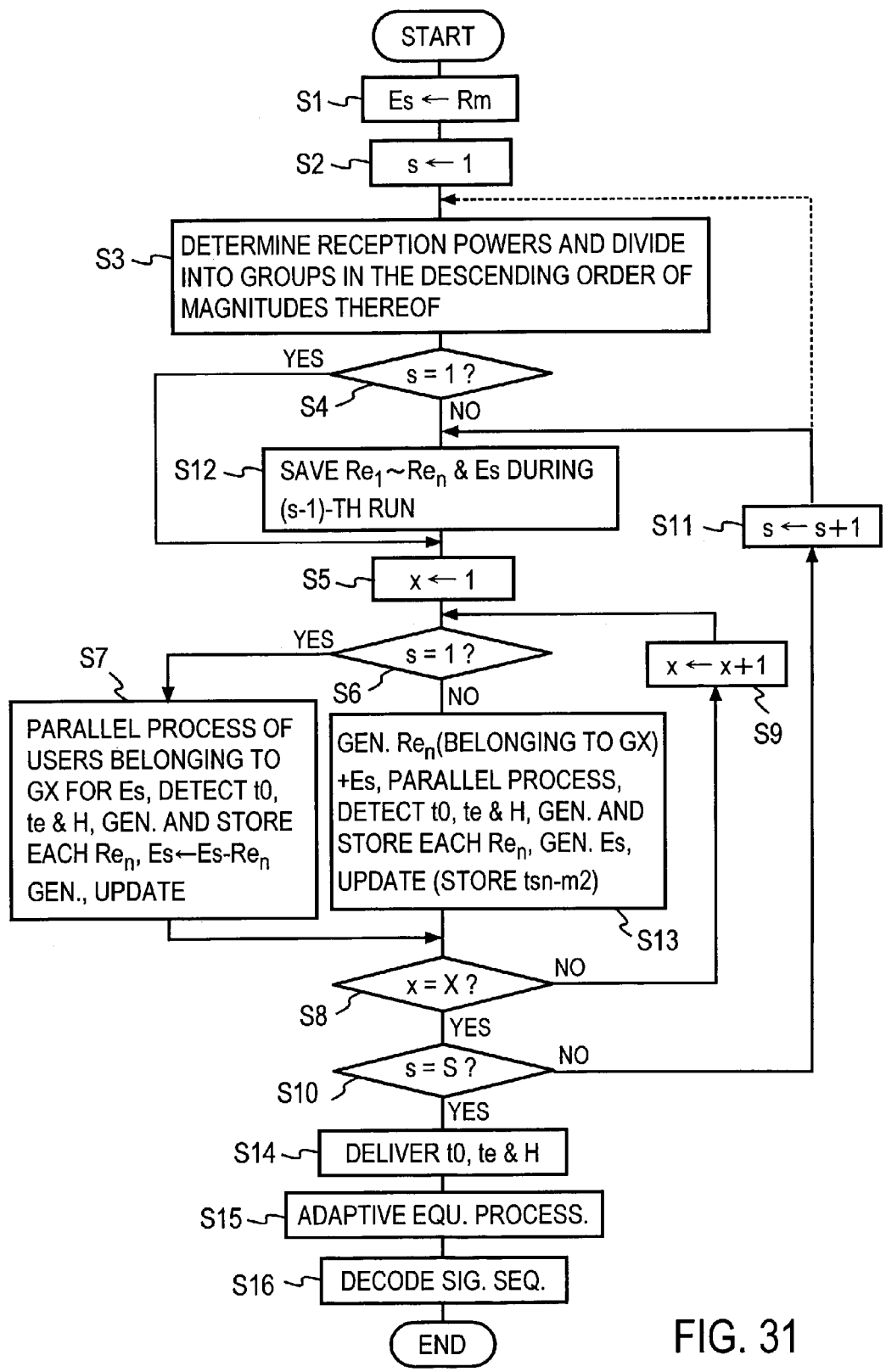
FIG. 31 is a flow chart of an exemplary processing procedure in the method of the present invention which corresponds to the seventh embodiment.

Referring to FIG. 31, a twelfth embodiment for the method which corresponds to the seventh embodiment will now be described. At step S1, an error signal parameter Es is initialized by a received signal Rm, at step S2, the processing run parameter s is initialized to 1, and at step S3, the reception power per symbol is determined for each of the training symbol sequences from N transmitters, and the transmitted training signal sequences are divided into groups G1 to GX, each including a plurality of signal sequences in the descending order of the magnitude. At step S4, an examination is made to see if s is equal to 1, and if it is, the group parameter x is initialized to 1 at step S5, and an examination is made at step S6 to see if s is equal to 1. If it is, using the training symbol sequences which belong to the group Gx, a parallel processing takes place for the error signal (received signal)(Es) to detect t0 and te and to estimate H at step S7. In addition, they are also used in generating and storing each received signal replica $Re_n$, and each replica $Re_n$ generated is subtracted from the error signal Es, thus updating Es.

At step S8, an examination is made to see if x is equal to X and if not, x is incremented by one at step S9 before returning to step S6. If x is equal to X at step S8, an examination is made at step S10 to see if s is equal to S, and if not, s is incremented by one at step S11 before transferring to step S12. If s is not equal to 1 at step S4, the operation transfers to step S12. At step S12, $Re_1$ to $Re_N$ and Es which are generated during the (s-1)-th run are saved before transferring to step S5. If s is not equal to 1 at step S6, each $Re_n$ which corresponds to the training symbol sequences which belong to the group Gx is added to the error signal Es to generate a plurality of interference suppression received signals, and the plurality of interference suppression received signals are subject to a parallel processing using the training symbol sequences which belong to the group Gx to detect t0 and te and to estimate H, and these are used in generating respective received signal replicas $Re_n$, thus updating and storing them, and the replica $Re_n$ which is thus generated is subtracted from a corresponding one of the plurality of interference suppression received signals to generate Es, thus updating Es at step S13 before transferring to step S8. If s is equal to S at step S10, t0, te and H which then prevail are fed to the MIMO adaptive equalizer 35 at step S14. It is to be noted that during the S-th run, no $Re_n$ is generated at step S13, and no Es is generated if x=X. The received signal is subject to the adaptive equalization at step S15, and the symbol sequence which has been subject to the equalization processing is decoded at step S16. While not shown, the error detection may take place as required, and if there is an error, timing candidates are used to determine t0 and te and H again.

While not specifically shown in FIGS. 29 to 31, in the process shown, the reliability of the detected time may be subject to a decision so that only replicas which do not correspond to a timing of a low reliability be delivered. In the-foregoing, although detection of a equalization duration is performed, it is also possible to fix a length of the equalization duration and not to detect the equalization duration.

In the foregoing description, it is explained that a correlation between a training symbol sequence $TSS_n$ is produced in each of the sync timing generators $12_n$ and the start timing/duration candidate generator $21_n$; however, it is also possible to arrange such that a correlation produced by the sync timing generator $12_n$ is stored to be utilized by the start timing/duration candidate generator $21_n$.

As shown in FIGS. 22 and 25, in the case where sync detection and channel estimation are performed by a composite processing stage 42, degradation in accuracy of the channel estimation for each user at the first processing stage $42_1$, in case of using serial processing stages, may possibly happen. This is because, during the search for the received signal of user 1 (the highest level of the received signal power), if channel estimation is performed by using individual channel estimation means as shown in FIG. 17 for each user, the received signal to be used contains components of signals received from the users 2–N. It is considered that since the received signal from the other users are cancelled in the received signal to be used for channel estimation in the second processing stage $42_2$ and subsequent stages, the use of serial processing stages would not cause serious degradation in channel estimation. Accordingly, as the means for solving the above problem, it is possible to arrange such that in the first processing stage $42_1$, sync start timings detected by sync detectors $82_1$–$82_N$ for all the users, training symbol sequences $TSS_1$–$TSS_N$ received signals (not having been processed by cancellation operation) are all input to the channel estimation part 28 (similar to that shown in FIG. 9) as indicated by broken line in FIG. 22 and all the channel states H are estimated and supplied to the replica generators $45_1$–$45_n$.

As mentioned above, according to the invention, the accuracy of estimating the channel status, the accuracy of detecting the equalization start timing and the accuracy of determining the equalization duration in the MIMO receiver can be improved. In particular, it is considered that the estimation of the channel status, the detection of the equalization start timing and the determination of the equalization duration must be repeated from frame to frame in the packet communication, and when the invention is used in such application, it is possible to reduce the length of the training symbol sequences which are used for the channel estimation and for the synchronization, allowing the quantity of information transmitted to be increased by a corresponding amount.

What is claimed is:

1. An MIMO receiver comprising
   an MIMO adaptive equalizer in which signals received by way of M antennas (where M is an integer equal to and greater than 2) for N signal sequences (where N is an integer equal to and greater than 2) transmitted on a common frequency band are subject to an adaptive equalization using an equalization start timing signal, an equalization duration signal and a channel status estimate to be divided into symbol sequences which corresponds to N transmitters;
   a signal sequence decoder for decoding N output symbol sequences from the MIMO adaptive equalizer;
   a training sequence generator for generating a training symbol sequence having the same symbol sequence as a training symbol sequence in the transmitted signal sequence;
   a first sync detector for receiving the training symbol sequence and a received signal as inputs to generate an equalization start timing signal and an equalization duration signal;
   a channel estimator for receiving the training symbol sequence, the equalization start timing signal, the equalization duration signal and the received signal as inputs to estimate a channel status;
   a replica generator for receiving the training symbol sequence, the equalization start timing signal, the equalization duration signal and the estimated channel status as inputs to generate a replica of the training symbol with respect to the received signal;
   an error signal generator for receiving the received signal and the received replica as inputs to subtract the received signal replica in the training symbol sequence from the received signal to generate an error signal;
   an adder for receiving the error signal and the received signal replica with respect to the training symbol sequence in at least one intended transmitted signal sequence as inputs to add them together to generate an interference suppression received signal which acts to suppress the received signals other than the intended transmitted signal sequence;
   and a second sync detector for receiving the interference suppression received signal and the training symbol sequence as inputs to generate the equalization start timing signal and the equalization duration signal.

2. An MIMO receiver according to claim 1 in which the first sync detector, the replica generator, the adder and the second sync detector are separately provided for each transmitted signal sequence, and the received signal replica for the training symbol sequence in the intended transmitted signal sequence which is input to the adder is one.

3. An MIMO receiver according to claim 2, further comprising a reliability decision unit which renders a decision on the reliability of a detected timing which is detected by the sync detector, and means for preventing a replica which corresponds to a detected timing which has been decided to be of a low reliability by the reliability decision unit from being delivered.

4. An MIMO receiver according to claim 1 further comprising
   a processing order detector for determining the reception power per symbol for each of N transmitted signal sequences and for determining a sequential order of the magnitude thereof;
   transmitted signal sequence processors each including the first sync detector, the channel estimator, the replica generator and a subtractor which subtracts the replica from the replica generator from the received signal which is input to the first sync detector before it is fed to the next second sync detector are in cascade connection in the determined sequential order;
   an output signal from the subtractor of the last transmitted signal sequence processor in the cascade connection being obtained as an error signal from the error signal generator;
   and the received signal replica for the training symbol sequence which is input to the adder being one having a maximum reception power per symbol.

5. An MIMO receiver according to claim 1 further comprising
   a processing order detector which determines the reception power per symbol of each of N transmitted signal sequences and dividing the N transmitted signal sequences into groups each including a plurality of transmitted signal sequences in a descending order of the magnitude of the reception power;
   there being a parallel processor formed for a plurality of transmitted signal sequences which belongs to one of the groups including the first sync detector, the channel estimator and the replica generator for performing the processing in a parallel fashion, the parallel processors being connected in series with each other in the descending order of the groups through a subtractor which subtracts the replica from the replica generator from an input signal to the first sync detector to be fed to the next parallel processor.

6. An MIMO reception method comprising the steps of
   separating and equalizing signals which are received by way of M antennas (where M is an integer equal to and greater than 2) from N signal sequences transmitted on a common frequency band (where N is an integer equal to and greater than 2) using an equalization start timing, an equalization duration and a channel status;
   decoding each of the N symbol sequences;
   a first sync detection for detecting the equalization start timing and the equalization duration using a received signal and a training symbol sequence which is separately determined for each transmitted signal sequence;

estimating a channel status using the received signal, a training symbol sequence separately provided for each transmitted signal sequence, the equalization start timing and the equalization duration;

generating a replica of a received signal for the training symbol using the training symbol sequence which is separately provided for each transmitted signal sequence, the equalization start timing and the estimated channel status;

generating an error signal by subtracting the training symbol received signal replica from the received signal;

adding a received signal replica for at least one intended transmitted signal sequence to the error signal to generate an interference suppression received signal which acts to suppress received signals other than the intended transmitted signal sequence;

and a second sync detection for detecting the equalization start timing and the equalization duration using the interference suppression received signal and the corresponding training symbol sequence.

7. An MIMO reception method according to claim 6 in which the first sync detection and the step of generating the replica are executed in parallel fashion for the transmitted signal sequences;

the generated N training symbol received signal replicas are subtracted from the received signal in the step of generating the error signal to generate the error signal and the step of generating the interference suppression received signal where the replica for each intended transmitted signal sequence is added to the error signal is executed in parallel fashion;

and the second sync detection which operate upon the generated N interference suppression received signals is executed in parallel fashion.

8. An MIMO reception method according to claim 6, further comprising the step of rendering a decision on the reliability of the detected equalization start timing;

and interrupting the use of the replica for the transmitted signal sequence which corresponds to the equalization start timing which is decided to be of a low reliability.

9. An MIMO reception method according to claim 6, further comprising the steps of determining the reception power per symbol for each of N transmitted signal sequences and determining a descending order of the magnitude of the reception power;

executing the sync detection, the channel estimation, the generation of the replica and the generation of the error signal in the determined descending order for each transmitted signal sequence wherein an error signal which is generated by the processing for each transmitted signal sequence is added with the received signal which is used in the processing of the transmitted signal sequence to provide a receiving signal which is to be used in the next processing of the transmitted signal sequence and wherein the generation of the interference suppression received signal and the second sync detection are executed upon the error signal which is generated during the last processing for each transmitted signal sequence.

10. An MIMO reception method according to claim 6, further comprising the steps of determining the reception power per symbol for each of the N transmitted signal sequences and dividing the N transmitted signal sequences into groups each including a plurality of transmitted signal sequences in the descending order of the magnitude of the reception power;

executing the first sync detection, the channel estimation and the generation of the replica for transmitted signal sequences which belong to one group in parallel fashion for each group and executing such processing for the groups in the descending order of the reception power wherein the replica which is generated by the processing for the group is subtracted from the received signal for the group processing to generate an error signal, which is used as an received signal in the processing of the next group and the generation of the interference suppression signal and the second sync detection take place upon the error signal which is obtained from the processing of the last group.

* * * * *